United States Patent
Saintellemy et al.

(10) Patent No.: US 10,325,484 B2
(45) Date of Patent: Jun. 18, 2019

(54) METHOD AND SYSTEM FOR DETERMINATION OF FALSE ALARM

(71) Applicant: Q-LINKS HOME AUTOMATION INC., Montréal (CA)

(72) Inventors: Frantz Saintellemy, Montréal (CA); Chengyu Tu, Montréal (CA); Van-Phuoc Do, Montréal (CA)

(73) Assignee: Q-Links Home Automation Inc., Montréal (CA)

( * ) Notice: Subject to any disclaimer, the term of this patent is extended or adjusted under 35 U.S.C. 154(b) by 0 days.

(21) Appl. No.: 15/538,791

(22) PCT Filed: Dec. 16, 2015

(86) PCT No.: PCT/CA2015/051335
§ 371 (c)(1),
(2) Date: Jun. 22, 2017

(87) PCT Pub. No.: WO2016/101065
PCT Pub. Date: Jun. 30, 2016

(65) Prior Publication Data
US 2017/0372597 A1    Dec. 28, 2017

Related U.S. Application Data

(60) Provisional application No. 62/096,224, filed on Dec. 23, 2014.

(51) Int. Cl.
*G08B 29/16* (2006.01)
*G08B 29/18* (2006.01)
(Continued)

(52) U.S. Cl.
CPC ......... *G08B 29/185* (2013.01); *G08B 21/182* (2013.01); *G08B 25/001* (2013.01);
(Continued)

(58) Field of Classification Search
CPC ........ G08B 29/00; G08B 29/04; G08B 29/14; G08B 29/145; G08B 29/16; G08B 21/182;
(Continued)

(56) References Cited

U.S. PATENT DOCUMENTS 5,659,292 A    8/1997  Tice
6,400,996 B1   6/2002  Hoffberg et al.
(Continued)

FOREIGN PATENT DOCUMENTS

CA    2886451    7/2014
WO    9934339    7/1999
(Continued)

*Primary Examiner* — Benyam Haile
(74) *Attorney, Agent, or Firm* — Bereskin & Parr LLP/S.E.N.C.R.L., s.r.l.

(57) ABSTRACT

A system and method for determining a false alarm includes receiving a provisional alarm signal from a safety alarm system, the provisional alarm signal indicating an alarm type. At least one sensor senses at least one present condition of a type corresponding to the alarm type indicated by the provisional alarm signal. A normal alarm signal is transmitted based on the at least one present condition sensed by the sensor.

19 Claims, 18 Drawing Sheets

(51) Int. Cl.
 *G08B 25/00* (2006.01)
 *H04L 12/28* (2006.01)
 *G08B 21/18* (2006.01)
 *G08B 19/00* (2006.01)
 *G08B 13/00* (2006.01)
 *G08B 17/10* (2006.01)

(52) U.S. Cl.
 CPC ........... *G08B 25/002* (2013.01); *G08B 29/16* (2013.01); *H04L 12/2825* (2013.01); *G08B 13/00* (2013.01); *G08B 17/10* (2013.01); *G08B 19/005* (2013.01)

(58) Field of Classification Search
 CPC ...... G08B 29/185; G01D 3/08; G01K 15/007; A61B 5/7221; A61B 5/746
 See application file for complete search history.

(56) References Cited

U.S. PATENT DOCUMENTS

| | | | |
|---|---|---|---|
| 7,183,899 B2 | 2/2007 | Behnke | |
| 7,221,260 B2 | 5/2007 | Berezowski et al. | |
| 7,302,642 B2 | 11/2007 | Smith et al. | |
| 8,547,238 B2 | 10/2013 | Harchanko | |
| 8,675,920 B2 | 3/2014 | Hanson et al. | |
| 9,922,540 B1 * | 3/2018 | Hutz ................. G08B 29/00 | |
| 2003/0085795 A1 | 5/2003 | An | |
| 2004/0117330 A1 | 6/2004 | Ehlers et al. | |
| 2005/0040247 A1 | 2/2005 | Pouchak | |
| 2005/0270151 A1 | 12/2005 | Winick | |
| 2007/0241203 A1 | 10/2007 | Wagner et al. | |
| 2009/0065596 A1 | 3/2009 | Seem et al. | |
| 2010/0102973 A1 | 4/2010 | Grohman et al. | |
| 2012/0061480 A1 | 3/2012 | Deligiannis et al. | |
| 2012/0185728 A1 * | 7/2012 | Guo ..................... F24F 11/0009 714/26 |
| 2013/0231792 A1 | 9/2013 | Ji et al. | |
| 2014/0096126 A1 | 4/2014 | Gourlay et al. | |
| 2014/0214214 A1 | 7/2014 | Asmus et al. | |
| 2014/0316743 A1 | 10/2014 | Drees et al. | |
| 2014/0324386 A1 | 10/2014 | Spivey et al. | |
| 2015/0053780 A1 | 2/2015 | Nelson et al. | |
| 2015/0053781 A1 | 2/2015 | Nelson et al. | |
| 2015/0088287 A1 | 3/2015 | Nagamatsu et al. | |
| 2015/0159893 A1 | 6/2015 | Daubman et al. | |
| 2015/0254972 A1 * | 9/2015 | Patterson ............. G08B 29/185 340/545.1 |
| 2016/0209059 A1 | 7/2016 | Castillo et al. | |

FOREIGN PATENT DOCUMENTS

| | | |
|---|---|---|
| WO | 2014172374 | 10/2014 |
| WO | 2016061686 | 4/2016 |
| WO | 2016101065 | 6/2016 |
| WO | 2016145514 | 9/2016 |

* cited by examiner

METHOD AND SYSTEM FOR DETERMINATION OF FALSE ALARM

CROSS-REFERENCE TO RELATED APPLICATIONS

The present application is a 35 USC 371 national stage entry of PCT/CA2015/051335 filed on Dec. 16, 2015 and that claims priority to U.S. 62/096,224 filed on Dec. 23, 2014. These documents are hereby incorporated by reference in their entirety.

FIELD OF THE DISCLOSURE

The present disclosure relates to a system and method for determination of false alarms, and more particularly a method and system in which possible false alarms generated from a safety alarm system are treated via a thermostat system.

BACKGROUND OF THE DISCLOSURE

Traditional thermostats known in the art are operable to monitor environmental conditions of an area of a building and control the heating, ventilation, and air condition system ("HVAC system") of the building based on the sensed condition. Typically, the thermostat allows a user to set a desired temperature as a setpoint and the thermostat will control the HVAC system so that the setpoint temperature is maintained at the area of the building. Control is provided by making a heating call or a cooling call to the HVAC system.

More advanced thermostats allow programming of a thermostat so as to follow a preprogrammed schedule. For example, different setpoints can be set for different times of the day and the thermostat will control the HVAC system so as to maintain those setpoints at the different times. Even more modern thermostats allows the thermostat to be accessed remotely, such as over the internet via a mobile device, so as to vary the setpoint or monitor indoor conditions from a remote location.

Building automation or home automation pertains to the automated control of various devices found within the building home. Devices being automatically controlled include lighting, appliances, security systems, access systems (ex: locks), HVAC systems, etc.

SUMMARY

It would thus be highly desirable to be provided with a device, system or method that would at least partially address the disadvantages of the existing technologies.

The embodiments described herein provide in one aspect, a system for determining a false alarm. The system comprising: a memory unit for storing a plurality of instructions, a processor coupled to the memory unit, the processor being configured to: receive a provisional alarm signal from a safety alarm system, the provisional alarm signal indicating an alarm type, sense with at least one sensor at least one present condition of a type corresponding to the alarm type indicated by the provisional alarm signal, and transmit a normal alarm signal based on the at least one present condition sensed by the sensor.

The embodiments described herein provide in another aspect a method for determining a false alarm. The method comprising: receiving a provisional alarm signal from a safety alarm system, the provisional alarm signal indicating an alarm type, sensing with at least one sensor at least one present condition of a type corresponding to the alarm type indicated by the provisional alarm signal, and transmitting a normal alarm signal based on the at least one present condition sensed by the sensor.

A non-transitory computer readable medium comprising a plurality of instructions for performing a method for determining a false alarm, wherein the instructions, when executed, configure a processor to: receive a provisional alarm signal from a safety alarm system, the provisional alarm signal indicating an alarm type, sense with at least one sensor at least one present condition of a type corresponding to the alarm type indicated by the provisional alarm signal, and transmit a normal alarm signal based on the at least one present condition sensed by the sensor.

DRAWINGS

The following drawings represent non-limitative examples in which.

DESCRIPTION OF VARIOUS EMBODIMENTS

Figure 1:
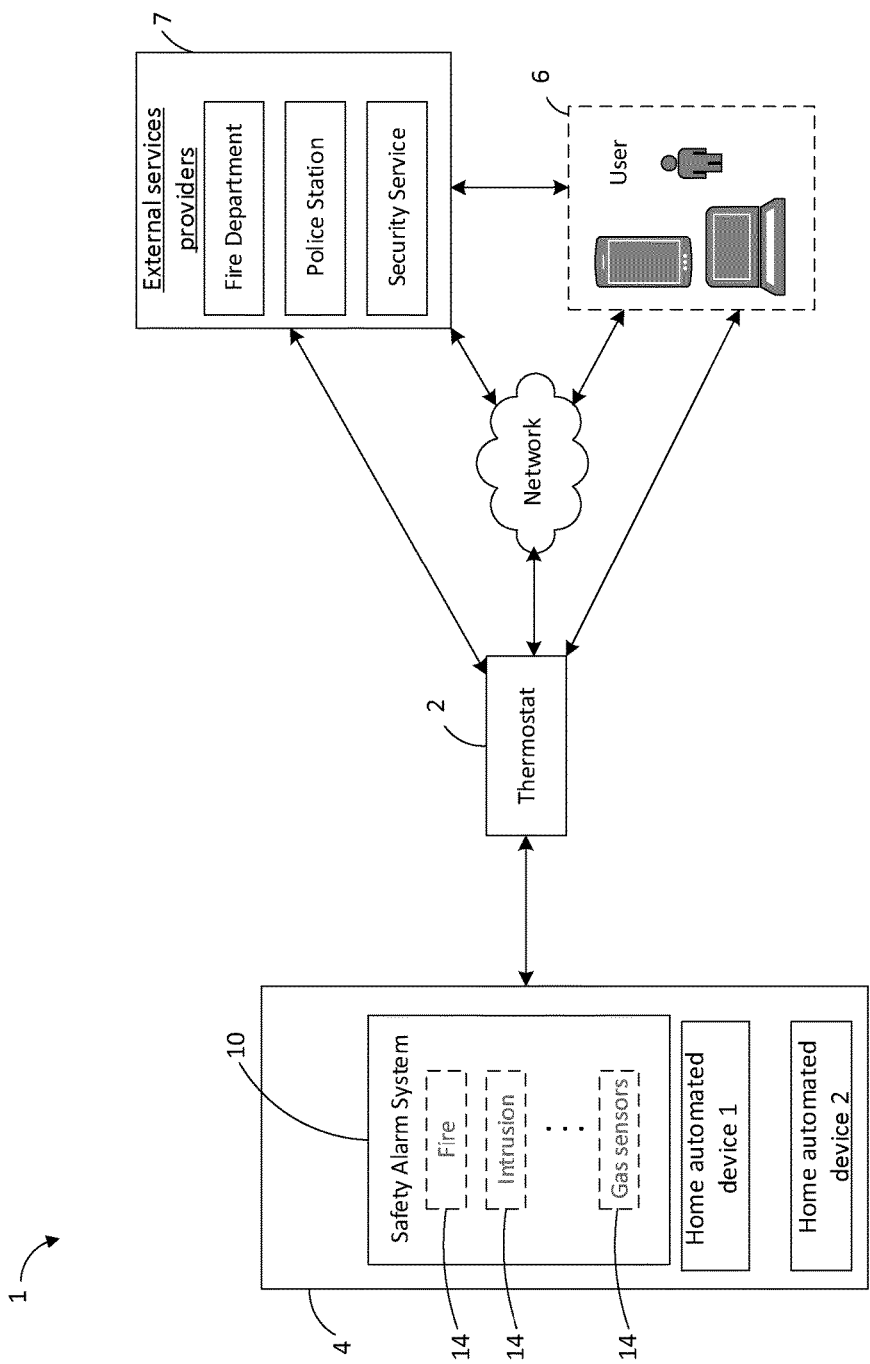
FIG. 1 illustrates a schematic diagram of a thermostat-controlled home automation system according to one exemplary embodiment.

The following examples are presented in a non-limiting manner.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices are directly connected to one another or connected to one another through one or more intermediate elements or devices via an electrical element, electrical signal or a mechanical element depending on the particular context.

"Home automated device" herein refers to a device found within a building that can be at least partially accessed in an automated way. The device may be a piece of equipment in the building that can be operated to effect a change in the condition of the building. The device may be operable to sense one or more conditions of the building, such as one or more environmental conditions. The device may also be any device located within the building and that may be operated in different modes. The home automated device may be controlled to cause a change in an operational mode of the device. Additionally, or alternatively, the home automated device may provide information pertaining to a condition within the building or to a status of the home automated device. For example, a status of the home automated device may be on/off status, usage, or current operational mode. Accessing a home automated device refers to controlling the device, receiving information from the device, or both. It will be understood that while the word "home" has been used, home automated device may also include devices found in residential as well as non-residential buildings (ex: commercial or industrial buildings).

"Automation", "automated" or variants, thereof refers to a way of accessing a device without real-time human intervention. For example, automated access may include where the access of a device is carried out so as to achieve a predefined requirement (ex: achieving a given setpoint). For example, automated access may also include where the access follows a predefined scheme (ex: various setpoints over time).

The expression "home automation network" herein refers to a local area network in which home automated devices and a thermostat system are nodes of the network. The home automated devices communicate with one another or with the accessing devices using a network protocol, such as Ethernet, ZigBee, Z-Wave, Bluetooth or Wi-Fi. The local area network can be wireless, wired or a mixture thereof.

"Networked home automated devices" herein refers to home automated devices that are nodes of the home automation network.

"Directly-connected home automated devices" herein refers to home automated devices that communicate directly with the thermostat system independently of the home automation network. For example, a directly-connected home automated device may be hard-wired with the thermostat system.

According to example systems disclosed herein, the at least one sensor is independent of the safety alarm system.

According to example systems disclosed herein, the system is a thermostat and comprises the at least one sensor and a HVAC interface.

According to example systems disclosed herein, the normal alarm is transmitted to an external service provider.

According to example systems disclosed herein, transmitting the normal alarm comprises: determining whether the sensed present condition exceeds a predetermined threshold, and transmitting the normal alarm if the sensed present condition exceeds the predetermined threshold.

According to example systems disclosed herein, transmitting the normal alarm comprises: transmitting a verification request to a user device, the request indicating the condition type, and transmitting the normal alarm signal in response to receiving a response from the user device confirming the provisional alarm.

According to example systems disclosed herein, transmitting the normal alarm comprises: transmitting a verification request to a user device if the sensed present condition does not exceed the predetermined threshold, the request indicating the alarm type, and transmitting the normal alarm signal in response to receiving a response from the user device confirming the provisional alarm.

According to example systems disclosed herein, the alarm type is intrusion and the at least one sensor comprises an occupancy/motion sensor.

According to example systems disclosed herein, the alarm type is fire alarm and the at least one sensor comprises at least one of a smoke detector and a temperature sensor.

According to example systems disclosed herein, the alarm type is presence of a gas and the at least one sensor comprises a gas detector.

According to example methods disclosed herein, the at least one sensor is independent of the safety alarm system.

According to example methods disclosed herein, the at least one sensor is internal to a thermostat system having a HVAC interface.

According to example methods disclosed herein, the normal alarm is transmitted to an external service provider.

According to example methods disclosed herein, transmitting the normal alarm comprises: determining whether the sensed present condition exceeds a predetermined threshold, and transmitting the normal alarm if the sensed present condition exceeds the predetermined threshold.

According to example methods disclosed herein, the transmitting the normal alarm comprises: transmitting a verification request to a user device, the request indicating the condition type, and transmitting the normal alarm signal in response to receiving a response from the user device confirming the provisional alarm.

According to example methods disclosed herein, transmitting the normal alarm comprises: transmitting a verification request to a user device if the sensed present condition does not exceed the predetermined threshold, the request indicating the alarm type; and transmitting the normal alarm signal in response to receiving a response from the user device confirming the provisional alarm.

According to example methods disclosed herein, the alarm type is intrusion and the at least one sensor comprises an occupancy/motion sensor.

According to example methods disclosed herein, the alarm type is fire alarm and the at least one sensor comprises at least one of a smoke detector and a temperature sensor.

According to example methods disclosed herein, the alarm type is presence of a gas and the at least one sensor comprises a gas detector.

Referring now to FIG. 1, therein illustrated is a block diagram of a thermostat-controlled home automation system 1 according to various exemplary embodiments. The thermostat-controlled home automation system 1 includes a thermostat system 2, a set 4 of home automated devices, at least one remote user device 6, and at least one external services provider 7.

The home automated devices of the set 4 are in communication with the thermostat system 2 to provide information to the thermostat system 2 and/or receive control signals therefrom. The home automated devices communicate with the thermostat system 2 according to various schemes described herein.

The at least one remote device 6 may be located near the thermostat system 2 (e.g. within the same building as the thermostat system 2) or remotely of the thermostat system 2 (e.g. outside the building of the thermostat system 2). The remote device 6 may be in communication with the thermostat system 2 via a local area network. In another example, the remote device 6 may be in communication with the thermostat system 2 via an external wide area network 16, such as the Internet or cell communication network (e.g. GSM, CDMA, LTE, HDSPA, etc.). In yet another example, the remote device 6 may be in direct one-to-one communication with the thermostat system 2 via a known communication protocol, such as Wi-Fi, Bluetooth, or Near Field Communication.

The at least one remote device 6 may be registered with the thermostat system 2 (e.g. either directly or via a server) in that at least one identifier of each of the registered remote devices 6 are known to the thermostat system 2 so as to permit the thermostat system 2 to communicate with the registered remote devices 6. For example, and as illustrated, the at least one remote device 6 includes a smartphone/tablet and a personal computer.

The at least one external services provider 7 can provide a service in response to an alarm received from the thermostat system 2. The services provided by the at least one external services provider 7 are typically health and safety related, such as fire department, police station, health services or security service. A response from the external services provider 7 may include dispatching one or more appropriate servicepersons to the building in which the thermostat system 2 is located.

The at least one external services provider 7 is located remotely of the thermostat system 2 and may be in communication with the thermostat system 2 via the wide area network or via a dedicated connection. The wide area network refers to a network where other data traffic may be transported, such as the Internet, cell communication network, or ground line phone network. The dedicated connection refers to a connection used only for communicating with the at least one external services provider.

Referring back to FIG. 1, the set 4 of home automated devices includes a safety alarm system 10 in communication with the thermostat system 2. The safety alarm system 10 includes at least one sensor 14 and is operable to raise at least one alarm in response to a change in condition sensed by the at least one sensor 14. The thermostat system 2 is further operable to receive the at least one alarm.

The safety alarm system 10 may be a typical alarm system installed in various residential or non-residential buildings. It will be appreciated that whereas a typical safety alarm system is immediately connected to the external services providers, the example home automation system 1 has the safety alarm system 10 connected to the external services providers via the thermostat system 2.

Figure 2:
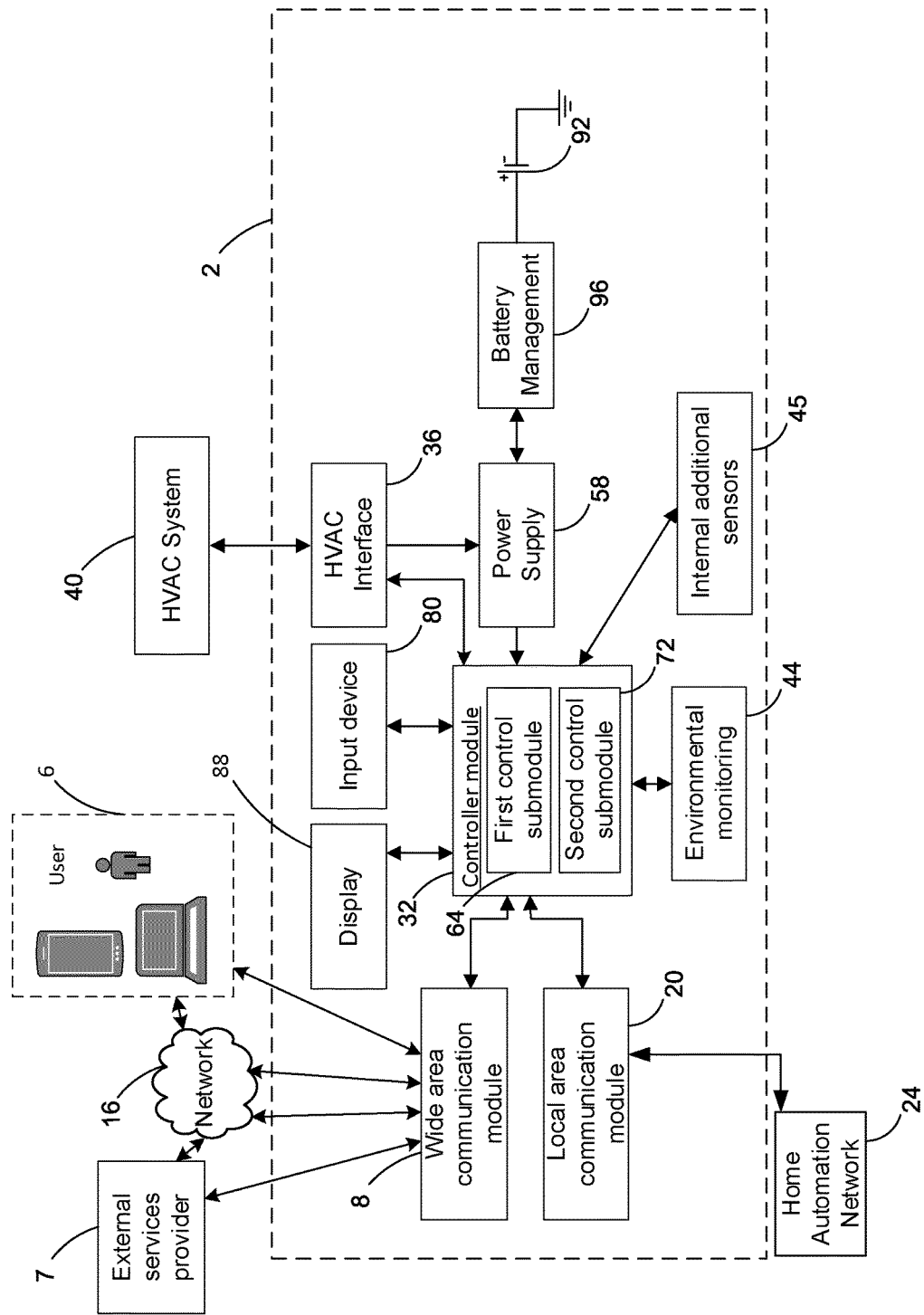
FIG. 2 illustrates a schematic diagram of the operational modules of a thermostat system according to one exemplary embodiment.

Referring now to FIG. 2, therein illustrated is a schematic diagram of the operational modules of a thermostat system 2 according to various exemplary embodiments. The thermostat system 2 may be used within a home automation system to provide centralized access of connected home automated devices.

The thermostat system 2 includes a wide area communication module 8 configured for data communication with an external wide area network 16, such as the Internet or cell network. For example, the wide-area communication module 8 may be implemented as a network interface controller, which may be an Ethernet or Wi-Fi module. For example, the wide-area communication module includes a Wi-Fi module. The wide-area communication module may also implement communication protocol, in hardware and/or software, for data communication with the external wide area network 16. The communication protocol may provide transport and/or link layer services, such as TCP/IP.

The thermostat system 2 also includes a local communication module 20 configured for data communication within a local home automation network 24. For example, the home automation network can be a local area network implemented using known technology standards such as Ethernet, Wi-Fi, Bluetooth, ZigBee, Z-Wave or mixture thereof. It will be understood that the local home automation network 24 can communicate with another device within the local home automation network 24 in a one-to-one relationship or via a hub or router.

According to various exemplary embodiments, the wide-area communication module 8 and the local communication module 20 may be implemented as a single module. For example, the single module may be in communication with the networked home automated devices via a hub or router, wherein the hub, router or one of the home automated devices provides communication with the external wide area network 16. For example, a suitable router within a local Ethernet and/or Wi-Fi network provides an internet connection while also allowing communication amongst nodes of the local network.

The thermostat system 2 further includes a controller 32 in signal communication with the wide-area communication module 8 and the local area communication module 20. The controller described herein may be implemented in hardware or software, or a combination of hardware and software. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller 32 is operable to transmit data to and receive data from the wide-area network 16 via the wide area communication module 8. The controller 32 is also operable to transmit data to and receive data from the home automation network 24 via the local area communication module 20.

According to various exemplary embodiments, the thermostat system 2 may also include a HVAC interface module 36. The output side of HVAC interface module 36 may be connected to a HVAC system 40. The HVAC interface module 36 may be further operable to control the HVAC system 40. For example, the HVAC interface module 36 may include mechanical, electrical and/or electronic components for making a heating call or cooling call to the HVAC system 40. For example, the HVAC interface module 36 may output HVAC control signals for controlling the HVAC system 40. For example, connection of the HVAC interface module 36 with the HVAC system 40 may be carried out according to known connections, such as using C, R, Rh, Rc, G, W, Y wires. Other connections may be used for more complex HVAC systems, such as heat pumps and multi-stage HVAC systems. For example, the HVAC interface module 36 can further control the HVAC system to provide humidifying and dehumidifying.

According to one exemplary embodiment, the HVAC interface module 36 may be integrated with other components of the thermostat system 2, such as the controller 32. The HVAC interface module 36, controller 32, wide area communication module 8 and local area communication module 20 may be implemented within an embedded system or as part of a system-on-chip.

According to other exemplary embodiments, the HVAC interface module 36 may be external to the thermostat system 2 and may be in communication with the controller 32 via the local area communication module 20 or via a data port of the thermostat system 2.

The thermostat system 2 may further include at least one environmental monitoring module 44 for sensing at least one condition of the environment surrounding the thermostat system 2. The environmental monitoring module 44 includes at least one physical sensor for sensing the at least one environmental condition. For example, the at least one physical sensor includes a temperature sensor for determining temperature of the environment surrounding the thermostat system 44. The at least one environmental monitoring module 44 is coupled to the controller 32 and the condition sensed by the environmental monitoring module. According to various exemplary embodiments, the thermostat system 2 includes a plurality of environmental monitoring modules 44 for sensing one or more of temperature, humidity level, concentration levels of CO, $CO_2$, smoke, formaldehyde, natural gas, volatile organic compounds (VoC), and dust/particles level.

According to other exemplary embodiments, the thermostat system 2 may further include at least one internal additional sensor 45. The internal additional sensor 45 is described as "internal" in that it is physically located within the form factor of the thermostat system 2. For example, the internal additional sensor 45 may be embedded within (e.g. sharing circuitry with) the thermostat system 2. The internal additional sensor 45 may sense a condition other than an environmental condition. For example, the additional internal sensor 45 may include an occupancy/motion sensor (hereinafter occupancy sensor), water flooding sensor, anemometer, vibration sensor (e.g. to detect vibration, shock, and or seismic waves), and fingerprint reader.

Figure 3:
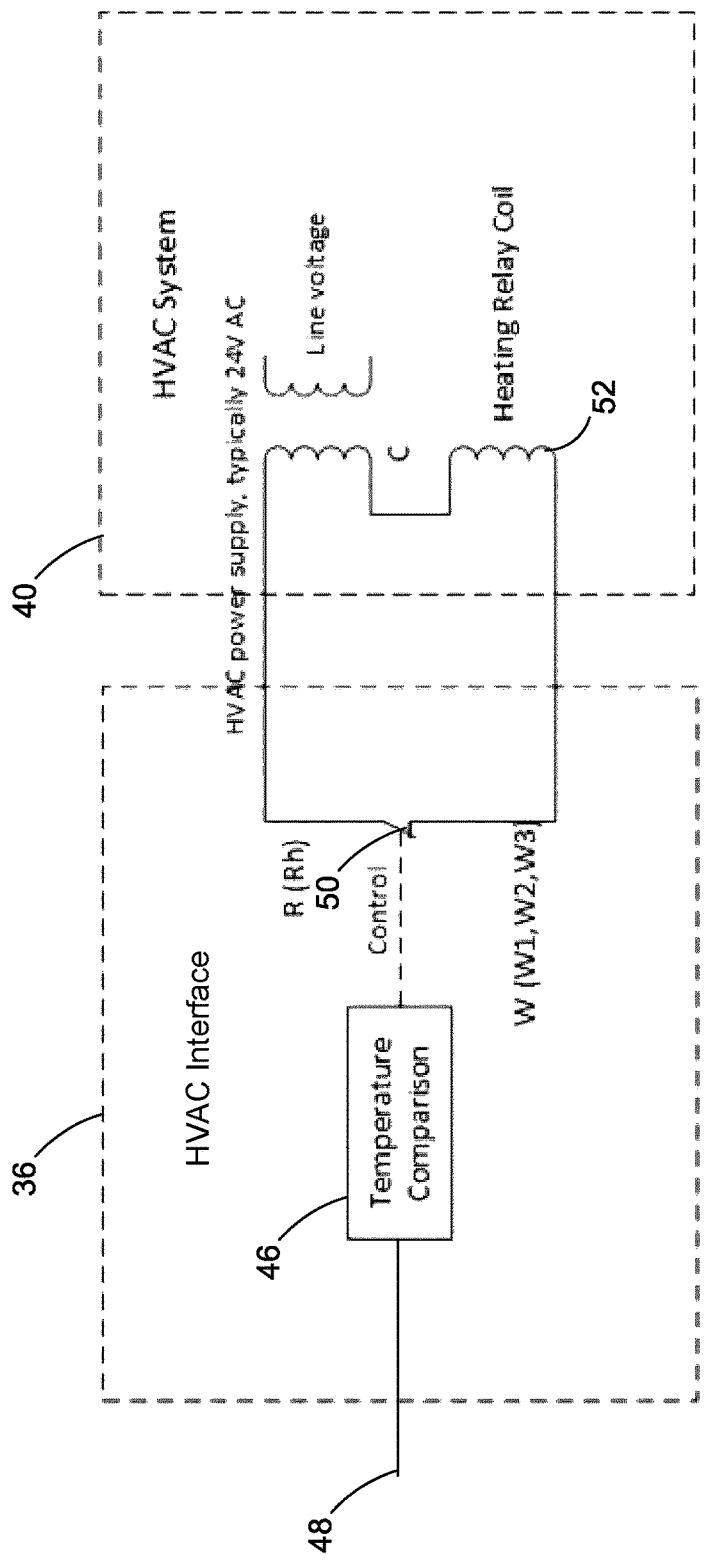
FIG. 3 illustrates a schematic circuit diagram of exemplary operative connections between an HVAC interface module and a HVAC system during a heating call.
Figure 4:
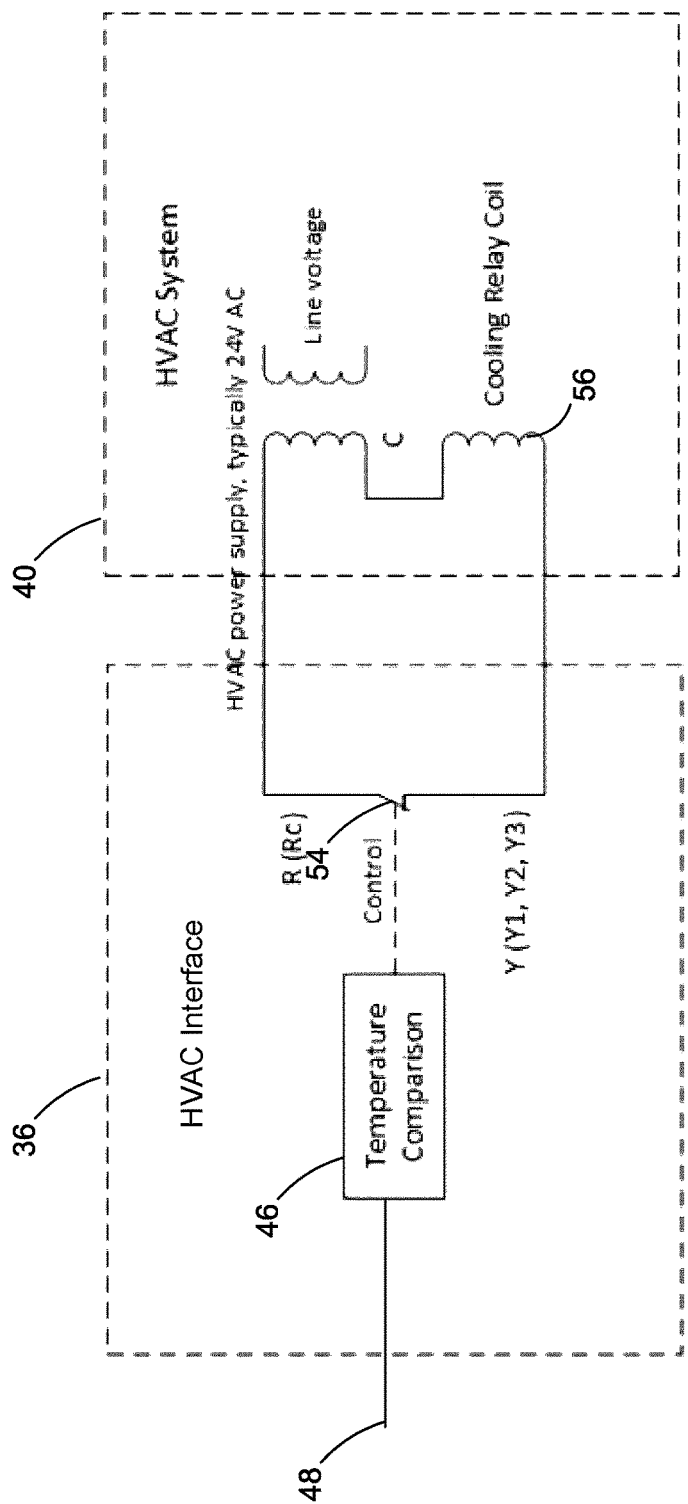
FIG. 4 illustrates a schematic circuit diagram of exemplary operative connections between an HVAC interface module and a HVAC system during a cooling call.

Referring now to FIGS. 3 and 4, therein illustrated are schematic circuit diagrams of operative connections between a HVAC interface module 36 with a HVAC system 40 during a heating call and a cooling call respectively. The HVAC interface module 36 includes a temperature comparator 46 having at least one input 48 for receiving a control signal indicating a desired temperature setpoint and a current temperature. For example, the current temperature may be sensed by the environmental monitoring module 44 (FIG. 2). The temperature comparator 46 compares the sensed current temperature with the temperature setpoint and outputs a control signal to the HVAC system 40. As illustrated in FIG. 3 the temperature comparator 46 can output a signal to drive a heating call relay 50, which causes current to flow through the heating relay coil 52 of the HVAC system 40, thereby causing the HVAC system 40 to begin heating. As illustrated in FIG. 4 the temperature comparator 46 can output a signal to drive a cooling call relay 54, which causes current to flow through the cooling relay coil 56 of the HVAC system 40, thereby causing the HVAC system 40 to begin cooling. Other calls may be possible for more complex HVAC systems. Controlling the HVAC system 40 to operate different leads to a change in environmental conditions within the building.

Referring back to FIG. 2 the thermostat system 2 further includes a power supply 58 for providing electrical power to various components of the thermostat system 2, such as the wide-area communication module 8, the local area communication module 20 and the controller 32. According to one exemplary embodiment, the power supply 58 may draw alternating current (AC) power from a typical 110V-220V AC mains electricity supply. According to another exemplary embodiment, the power supply 58 draws electric power from the HVAC system 40, which may typically be 24V AC.

According to various exemplary embodiments wherein the thermostat system includes an internal HVAC interface, the controller 32 includes a first control submodule 64 configured to access the HVAC interface module 36. The first control submodule 64 can generate one or more control signals for accessing the HVAC system 40 via the HVAC interface 36. For example, the first control submodule 64 can generate a control signal to change the temperature setpoint for the HVAC system 40. For example, the first control submodule 64 can also generate a control signal to change the humidity setpoint for the HVAC system 40.

According to various exemplary embodiments, the first control submodule 64 in combination with the HVAC interface module 36 can receive data information pertaining to an environmental condition, such as temperature and/or humidity level and control the HVAC system based on the received information. The environmental condition may be received from the environmental monitoring module 44. The control may be performed exclusively by the first control submodule 64, exclusively by the HVAC interface module 36 or a combination of both the first control submodule 64 and the HVAC interface module 36. For example, the first control submodule 64 may send control signals to the HVAC interface module 36 to set a temperature setpoint and/or humidity setpoint. This temperature setpoint and/or humidity setpoint may be selected based on a user-inputted command or a preprogrammed schedule. The HVAC interface 36 can further control various relays of the HVAC system 40 for heating, cooling, humidifying or dehumidifying based on the received temperature set point and/or humidity setpoint.

In some further examples, the first control submodule 64 and/or the HVAC interface module 36 can monitor indoor air quality, such as concentration levels of CO, $CO_2$, smoke, formaldehyde, natural gas, VoC and dust/particles level and appropriately control the HVAC system 40 to improve the air quality. For example, the environmental monitoring module 44 can monitor such environmental conditions.

Data information pertaining to one or more environmental conditions may be received from the internal environmental monitoring module 44 of the thermostat system (if provided). Alternatively, data information pertaining to one or more environmental conditions may be received from environmental monitoring devices directly connected to the thermostat system 2 and/or network-connected to the thermostat system 2, as described hereinbelow.

The controller 72 includes a second control submodule 72 configured to access home automated devices that are network connected to the thermostat system 2. The second control submodule 72 can also generate one or more control signals for controlling one or more network connected home automated devices that are operable to be controlled. The control signals generated for each controllable network connected home automated device may depend on the type of that home automated device.

According to various exemplary embodiments, as a given home automated device is connected to the thermostat system 2 via the home automation network 24, the second control submodule 72 can be programmed so as to become configured to generate control signals that correspond to the properties of the given home automated device 1. For example, where the given home automated device is a dimmable light, the second control submodule 72 can be programmed with a light control submodule for controlling the light to different brightness levels.

According to various exemplary embodiments, the thermostat system 2 includes an input device 80 and a display 88. For example, the input device 80 can be a keypad, mouse, voice recognition, stylus, and/or a touchscreen. In the case of a touchscreen, the input device 80 is integrated with the display 88. The input device 80 can be manipulated by a human user to enter commands. Commands inputted by the user can be received at the controller 32.

According to various exemplary embodiments wherein the thermostat system includes an internal HVAC interface 36, where the command is for controlling the HVAC system 40, the first control submodule 64 can generate a control signal based on the received command. In particular, the command can be for changing an environmental setting (ex: desired temperature and/or humidity) and the first control submodule 64 can at least generate a control signal based on the received command for controlling the HVAC system 40 via the HVAC interface 32.

Where the command is for controlling a network connected home automaton device, the second control module 72 can generate a control signal based on the received command and further based on the programming of the second control module 72 storing properties of the given network connected home automated device. The generated control signal can then be transmitted via the local communication module 20 and over the home automation network 24 to control the given home automated device. For example, the command can be for changing a non-environmental setting.

Where the second control submodule 72 is programmed based on a given home automated device being added to the home automation network 24 and being connected to the thermostat system 2, the second control submodule 72 can be further programmed to display on the display 88 a user interface having various elements that can be manipulated by a user, such as buttons, sliders, etc. The elements displayed may be specific to properties of the given home automaton device so that a user can easily provide control commands specific to the home automated device. For example, programming the second control submodule 72 may be installing software or adding an "app" specific to the given home automated device.

The control module 32 can further receive over the wide-area network 16, such as the internet, one or more commands for accessing one or more of the home automated devices. The one or more commands are received via the wide-area communication module 8. The commands may be inputted using a user-operable device connected to the wide-area network, such as computer or mobile device (ex: tablet, smartphone). The user-operable device may be one of the registered remote devices 6. The command may also be generated from a predetermined control scheme stored on a device connected to the wide-area network. For example, the control scheme can be predefined by a user, such as via a web portal, and saved to a server. The server can then send the commands over the wide-area network 16 to the communication module 8.

According to various exemplary embodiments wherein the thermostat system includes an internal HVAC interface 36, where the command received over the wide-area network is for controlling the HVAC system 40, the first control submodule 64 can generate a control signal based on the received command.

Where the command received over the wide-area network 16 is for accessing a network connected home automated device, the second control submodule 72 can generate a control signal based on the received command. It will be appreciated that the thermostat system 2 having the wide-area communication module and the local area communication module act as a network gateway between the wide-area network 16 and a network connected automation device. That is, the thermostat system 2 provides a bridge between the wide-area network 16 and the home automation network 24. More particularly, the thermostat system 2 is operable to translate network protocols of the wide-area network 16 to network protocols of the home automation network 24, and vice versa.

It will be appreciated that according to various exemplary embodiments wherein the thermostat system includes an internal HVAC interface 36, the HVAC system 40 is connected to the thermostat system 2 while bypassing the home automation network connection 24. Therefore, the HVAC system 40 can be controlled independently of the home automation network 24. That is, the HVAC system can be controlled without using the home automaton network 24.

In the example of FIG. 2, the HVAC interface 36 is included within the thermostat system 2. Control signals generated by the first control submodule 64 follow a signal path to the HVAC system 40 via the HVAC interface 36 while bypassing the home automation network connection 24. Therefore, it is possible to operate the thermostat system 2 to control the HVAC system 40 without requiring a home automation network 24 or a wide-area network connection 16. Alternatively, the wide-area network connection 16 can be used to receive commands from a remote device over the wide area network 16 to control the HVAC system 40 or send data to the remote device over the wide area network 16, while still not requiring a home automation network 24.

However, the availability of the local communication module 20 and the second control module 72 allows the thermostat system 2 to be scalable. More particularly, the thermostat system 2 is scalable in that access of additional home automated devices with the thermostat system 2 can be provided by making use of the second control submodule 72, the local area communication module 20 and the home automation network 24. The additional home automated devices may be added as network connected home automated devices to provide scalability.

Continuing with FIG. 2, according to various exemplary embodiments, the thermostat system 2 may further include a battery 92 and a battery management module 96. According to some exemplary embodiments, the battery management module 96 can be configured to cause the battery 92 to provide electric power to components of the thermostat system 2 when there is a power outage, or boost current supply when the power from the HVAC system 40 is limited.

Figure 5:
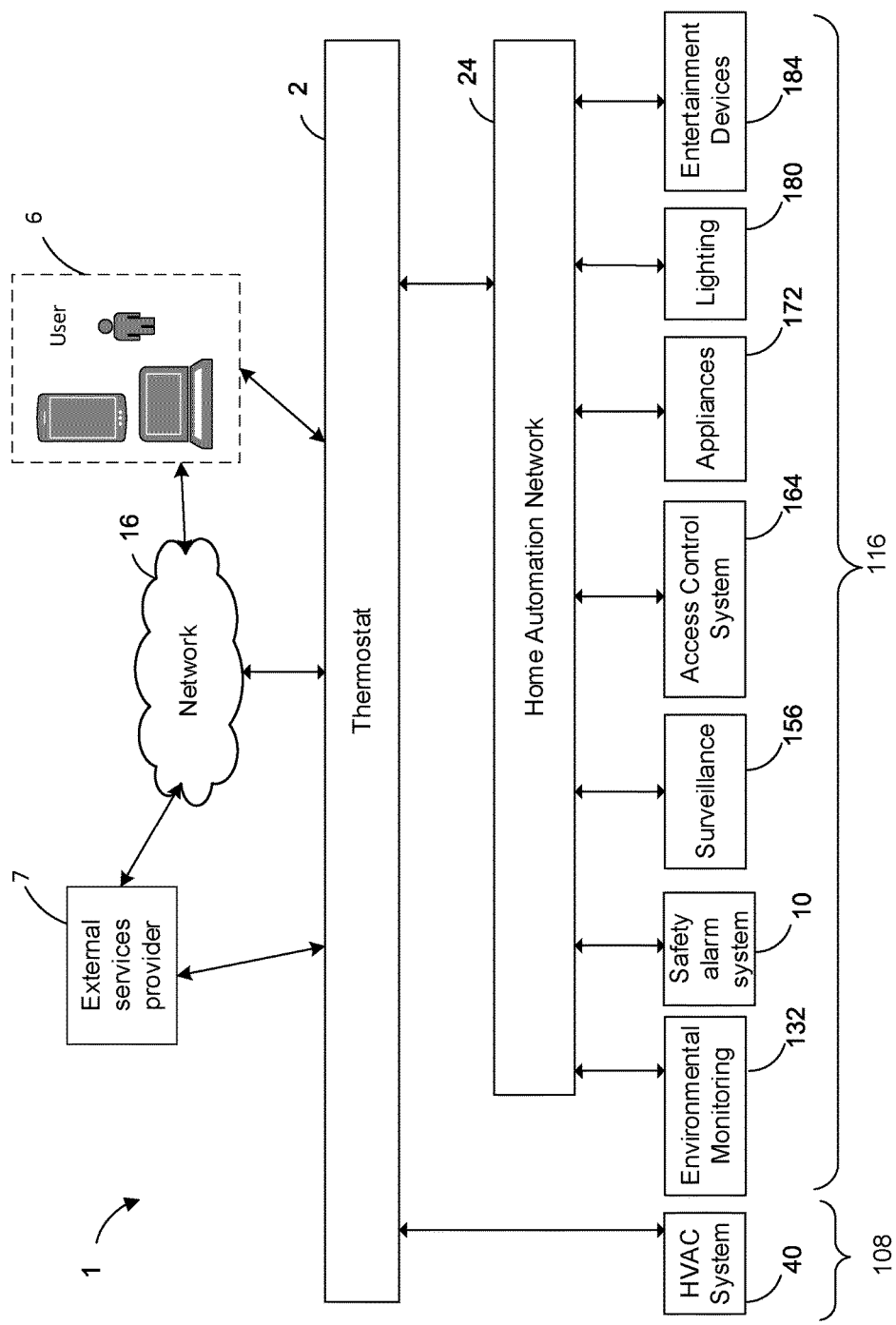
FIG. 5 illustrates a schematic diagram of a home automation system according to one exemplary configuration.

Referring now to FIG. 5, therein illustrated is a schematic diagram of a home automation system 1 according to one exemplary configuration. The system 1 includes a thermostat system 2 providing centralized access to a plurality of home automated devices.

The thermostat system 2 is operable to communicate with home automated devices according to a two-tier scheme. The two tier scheme herein refers to the thermostat system 2 being differently coupled to the plurality of home automated devices so as to communicate with home automated devices in at least two different ways.

In the first tier, at least one home automated device 116 forming a first subset of the plurality of home automated devices 108 is directly connected to the thermostat system 2. For example, the directly connected home automated device 108 is connected to the thermostat system 2 in a star data communication relationship. For example, the at least one directly connected home automated device is in data communication with the thermostat system 2 while bypassing the home automaton network 24. Since the thermostat system 2 includes an internal HVAC interface 36 allowing the thermostat system 2 to be directly connected to the HVAC system 40, the HVAC system 40 may belong to first subset of home automated devices 108. For example, and as illustrated, the first subset of directly connected home automated devices includes only the HVAC system 40.

In the second tier, at least another one home automated device may form a second subset of the plurality of home automated devices and may be connected to the thermostat system 2 via the home automation network 24. The home automated devices belonging to the second subset are each a network connected home automated device 116. The second control module 72 of the thermostat system 2 is operable to generate control signals, which are transmitted over the home automation network 24 to one or more of the network connected automated home devices 116 of the second subset. The one or more network connected automated home devices 116 receiving the control signals are then controlled accordingly. For example, the control signals control the one or more network connected home automated devices according to a home automation network protocol. The home automation network protocol may be a known or standard protocol, such as X10, ZigBee, Z-Wave, Bluetooth. For example, and as illustrated, the networked home automated devices connected to the home automation network 24 may include at least one external environmental monitoring device 132, the safety alarm system 10, a surveillance system 156, an access control system 164, at least one appliance 172, at least one lighting device 180 and at least one entertainment device 184.

The external environmental monitoring device 132 may include one or more sensors for sensing one or more conditions. The plurality sensors may be provided in one device, or a plurality of devices. The sensed conditions may include temperature, humidity level, concentration levels of CO, $CO_2$, smoke, formaldehyde, natural gas, VoC, dust/particles level, UV light level (ex: UVA or UVB), water inundation, earthquake detection, etc.

It will be appreciated that the at least one home automated device 108 belonging to the first subset of devices can be in signal communication with the thermostat system 2 independently of the home automation network 24. That is, the directly connected home automated device can be accessed by the thermostat system 2 independently of the operation of the home automation network 24. For example, in some cases, the thermostat system 2 can be operable to control the at least one devices of the first subset of devices even where a home automation network 24 is not provided. That is, the home automated devices may all belong to the first subset and the second subset does not have any members.

Continuing with FIG. 5, the thermostat system 2 is further operative to transmit and receive data over a wide area network 16, such as the Internet. It will be appreciated that the thermostat system 2 acts as a gateway for the network connected home automated devices 116 to the wide area network 16.

Figure 6:
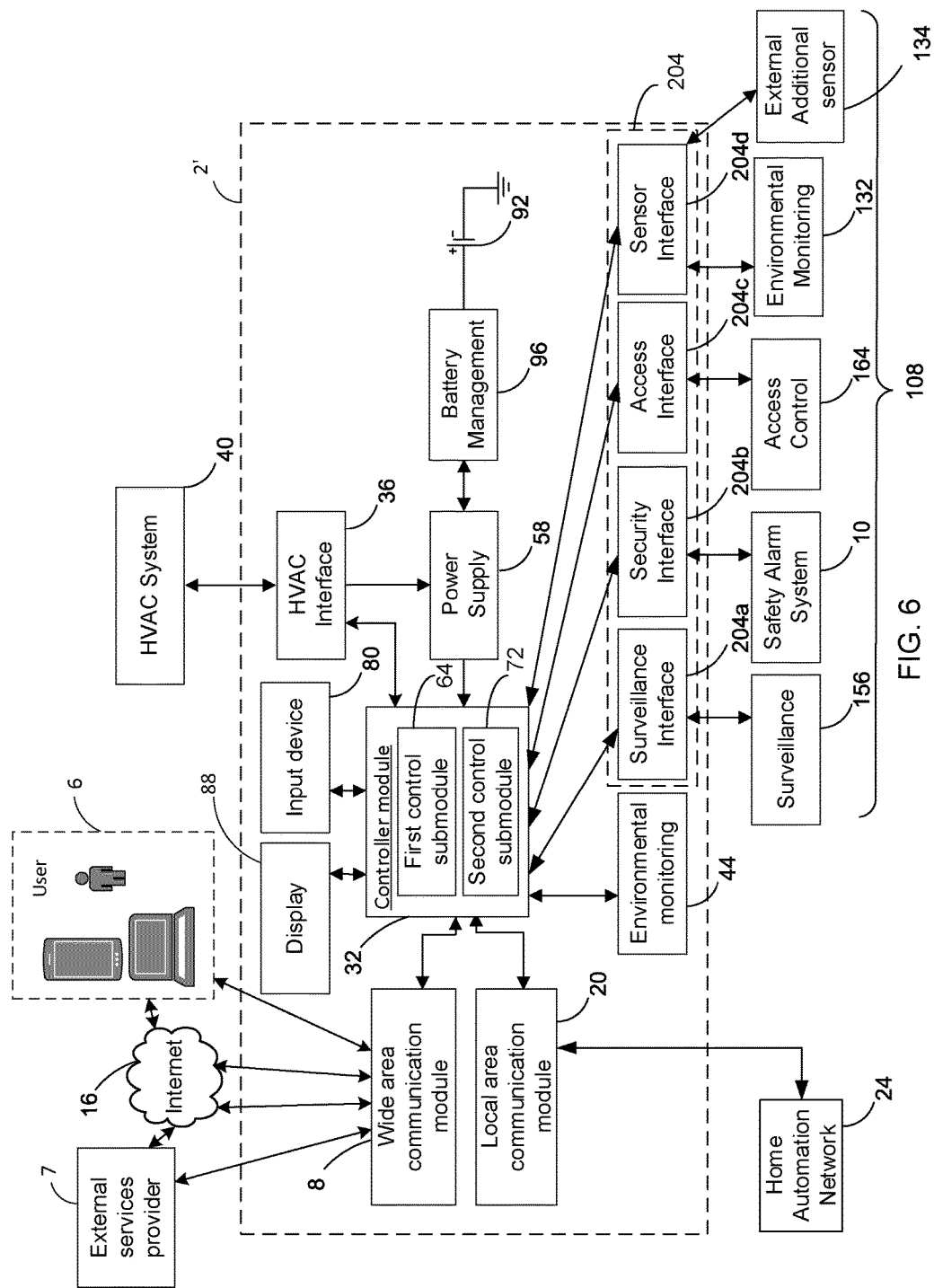
FIG. 6 illustrates a schematic diagram of the operational module of a thermostat system according to one variant exemplary embodiment.

Referring now to FIG. 6, therein illustrated is a schematic diagram of a thermostat system 2' according to an exemplary variant of the thermostat system 2 illustrated in FIG. 2. The thermostat system 2 of FIG. 6 is similar to that of FIG. 2 but further includes at least one additional device interface 204 that is coupled to the control module 32. The device interface 204 can be directly connected to one or more home automated devices. For example, each device interface 204 is directly connected to one home automated device. For example, at least one of the device interfaces 204 may be preconfigured according to a type of home automated device to be connected to that interface. For example, the device interface 204 may have an interface board implemented in hardware, which may be updated via firmware.

The at least one additional device interface 204 is in data communication with the controller 32. Accordingly, the controller 32 may be operable to generate a control signal, which can be transmitted to at least one of the directly connected home automated devices via the at least one additional device interface 204. Similarly, the controller 32 may be operable to receive data from at least one of the directly connected home automated devices via the at least one additional device interface 204. The received data may provide information about a status or condition of a home automated device connected via a device interface 204.

The at least one additional device interface 204 may be connected to typical devices that will be included in the home. For example, these typical devices may be ones that are centrally connected within the building. Such devices may include a surveillance system, an alarm system, a building access system, and various environmental sensors (ex: thermometer, barometer, humidity level detector). As illustrated, the exemplary thermostat system 2' includes a surveillance interface 204a for accessing the surveillance system 156, a security interface 204b for accessing a the safety alarm system 10, an access interface 204c for accessing a building access control system 164 and a sensor interface 204d for accessing one or more external monitoring devices 132. For example, the external monitoring devices 132 provide sensing of environmental conditions other than those sensed by the internal environmental monitoring system. Alternatively, or additionally, the external monitoring devices 132 can monitor conditions at locations remote of thermostat system 2, such as another room of the building or outside the building (i.e. multi-zone sensing/monitoring).

The sensor interface 204*d* may also access at least one directly connected home automated device that is an external additional sensor 134. The external additional sensor 134 is described as "external" in that is not physically located within the form factor the thermostat system 2 while maintaining communication with the thermostat system 2'. For example, and as illustrated in FIG. 6, the external additional sensor 134 includes directly connected external additional sensor 134. However, it will be understood that the external additional sensor 134 may also be a network connected home automation device. In some exemplary embodiments, the external additional sensor 134 may include at least one directly connected external additional sensor and at least one network-connected external additional sensor. For example, the external additional sensor 134 may be include an occupancy sensor, water flooding sensor, anemometer, vibration sensor (e.g. to detect vibration, shock, and or seismic waves), and fingerprint reader.

According to one exemplary embodiment, the first control submodule 64 may be further operable to access (control and receive information) for one or more of the directly connected home automated devices in communication with the controller 32 via one or more of the device interfaces 204. For example, the first control submodule 64 may be preprogrammed according to home automated devices that are expected to be directly connected to the thermostat system 2'.

Figure 7:
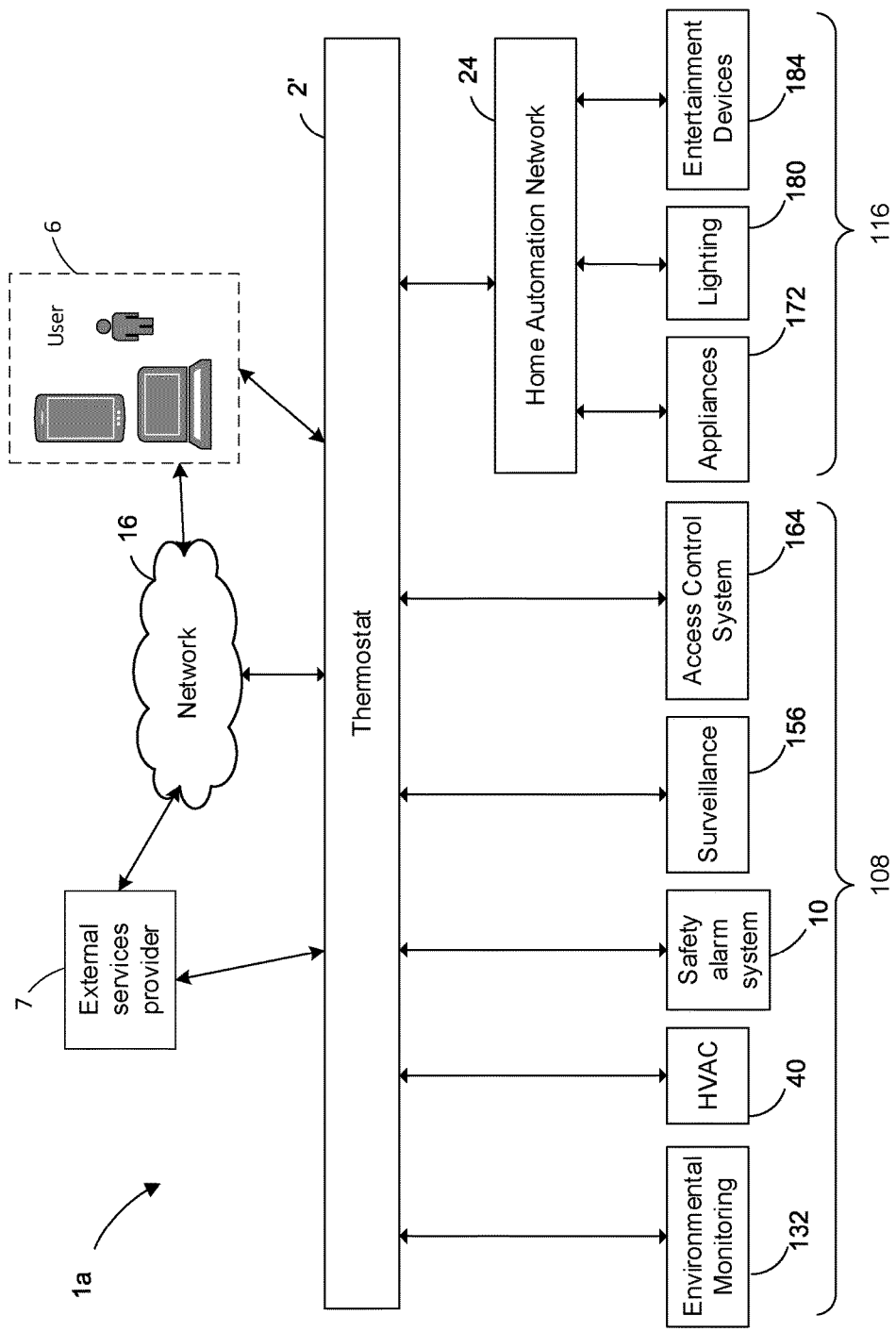
FIG. 7 illustrates a schematic diagram of a home automation system according to one exemplary configuration.

Referring now to FIG. 7, therein illustrated is a schematic diagram of a home automation system 1*a* according to another exemplary configuration. As illustrated, the home automation system 1*a* includes the thermostat system 2' having at least one addition device interface 204 as described herein with reference to FIG. 5. It will be appreciated that in the home automation system 1*a*, the first subset of home automated devices 108 being directly connected to the thermostat system 2' has more than one member.

As illustrated, and consistent with FIG. 6, the first subset of home automated devices 108 being directly connected to the thermostat system 2' includes the external environmental monitoring device 132, the HVAC system 40, the security system 10, the surveillance system 156 and the access control system 164. Being directly connected with the thermostat system 2', each of the directly connected home automated devices 108 may be accessed by the thermostat system 2' independently of the home automation network 24. That is, the thermostat system 2' is in communication with each of the directly connected home automated devices 108 while bypassing the home automation network 24.

Figure 8:
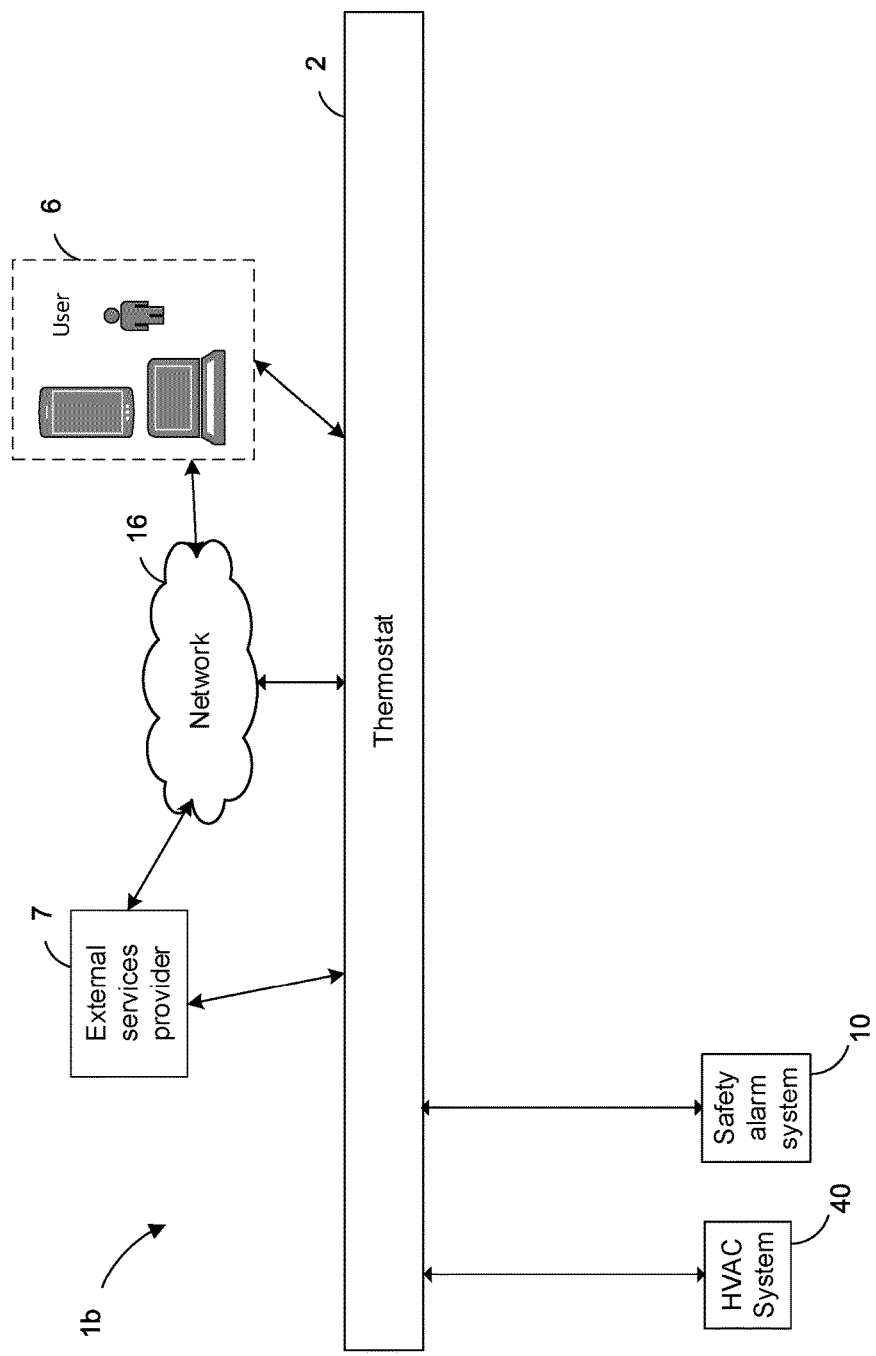
FIG. 8 illustrates a schematic diagram of a home automation system according to one exemplary configuration.

Referring now to FIG. 8, therein illustrated is a schematic diagram of a home automation system 1*b* according to yet another exemplary configuration. The home automation system 1*b* may include either one of the thermostat system 2 described herein with reference to FIG. 2 or the variant thermostat system 2' described herein with reference to FIG. 6. As illustrated, only the HVAC system 40 and the safety alarm system 10 are provided within the home automation system 1*b*. It will be appreciated that the providing of the internal HVAC interface 36 within the thermostat system 2 allows it to be used in a way that resembles a traditional thermostat. For example, where a connection to the wide area network is not provided, a user can input commands or provide a preprogrammed HVAC control schedule using the user input device 80 of the thermostat, and the thermostat system 2 can be operable to control the HVAC system 40 according to the inputted command or preprogrammed system. For example, where a connection to the wide-area network 16 is provided, commands or HVAC control schedule may be inputted by the user using a suitable device via the wide-area network 16. Information pertaining to the HVAC system 40 may be further received by the user device over the wide-area network 16. As illustrated in FIG. 8, the example home automation system 1*b* further includes a safety alarm system 10 being a directly-connected home automation device.

Figure 9:
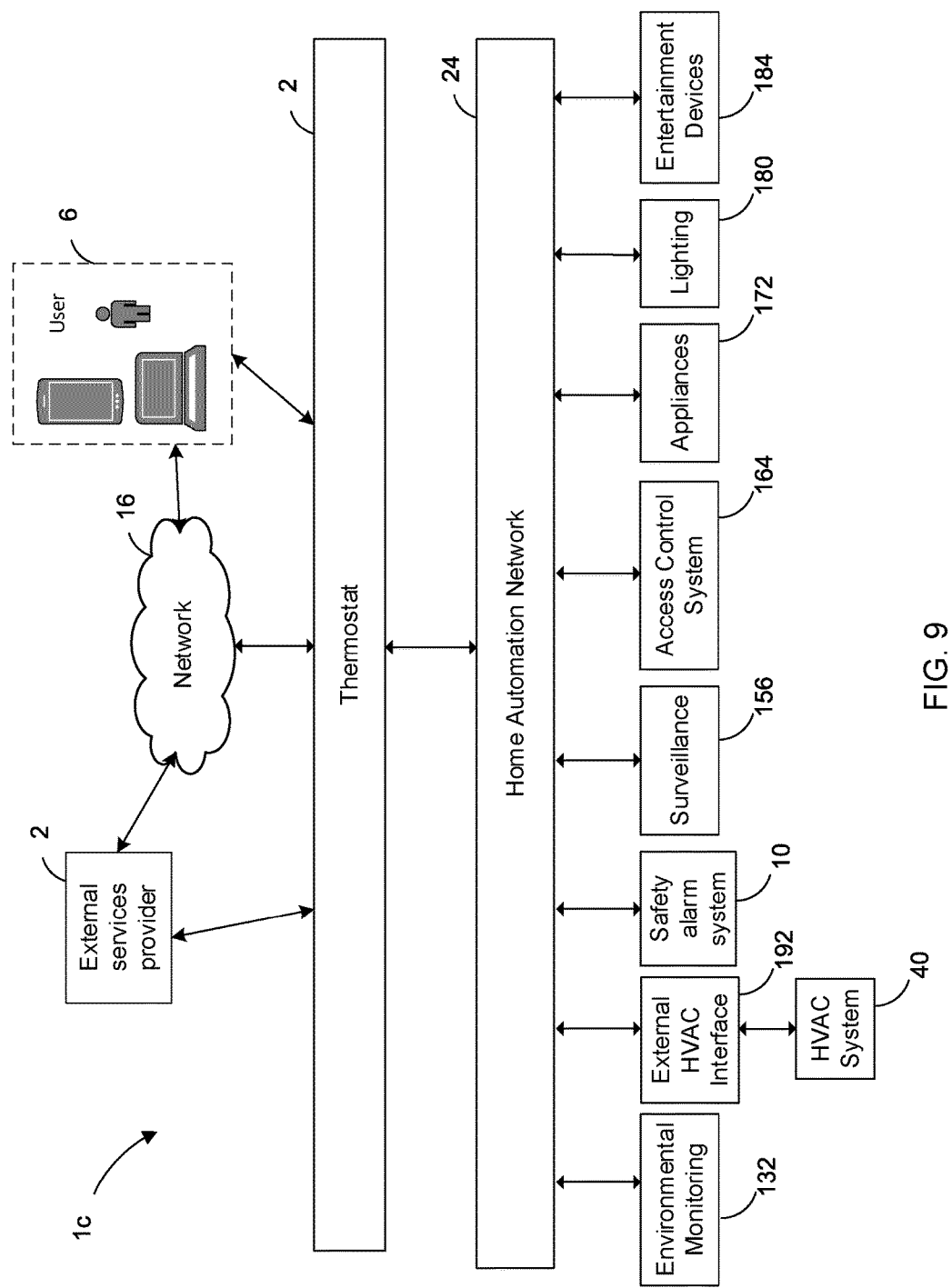
FIG. 9 illustrates a schematic diagram of a home automation system according to one exemplary configuration.

Referring now to FIG. 9, therein illustrated is a schematic diagram of a home automation system 1*c* according to yet another exemplary configuration. According to this exemplary configuration, each of the home automated devices of the home automation system 1*c* is a network connected home automated device 116 that communicates with the thermostat system 2 or variant thermostat system 2' via the home automation network 24. An external HVAC interface 192 is provided to generate signals for the HVAC system 40. That is, the external HVAC interface 192 is hardwired to the HVAC system 40, while being accessed by the thermostat system 2 via the home automation network 24. For example, this configuration may be used where the thermostat system 2, 2' is being provided within an already existing home automation network 24 that included an external HVAC interface 192.

Figure 10:
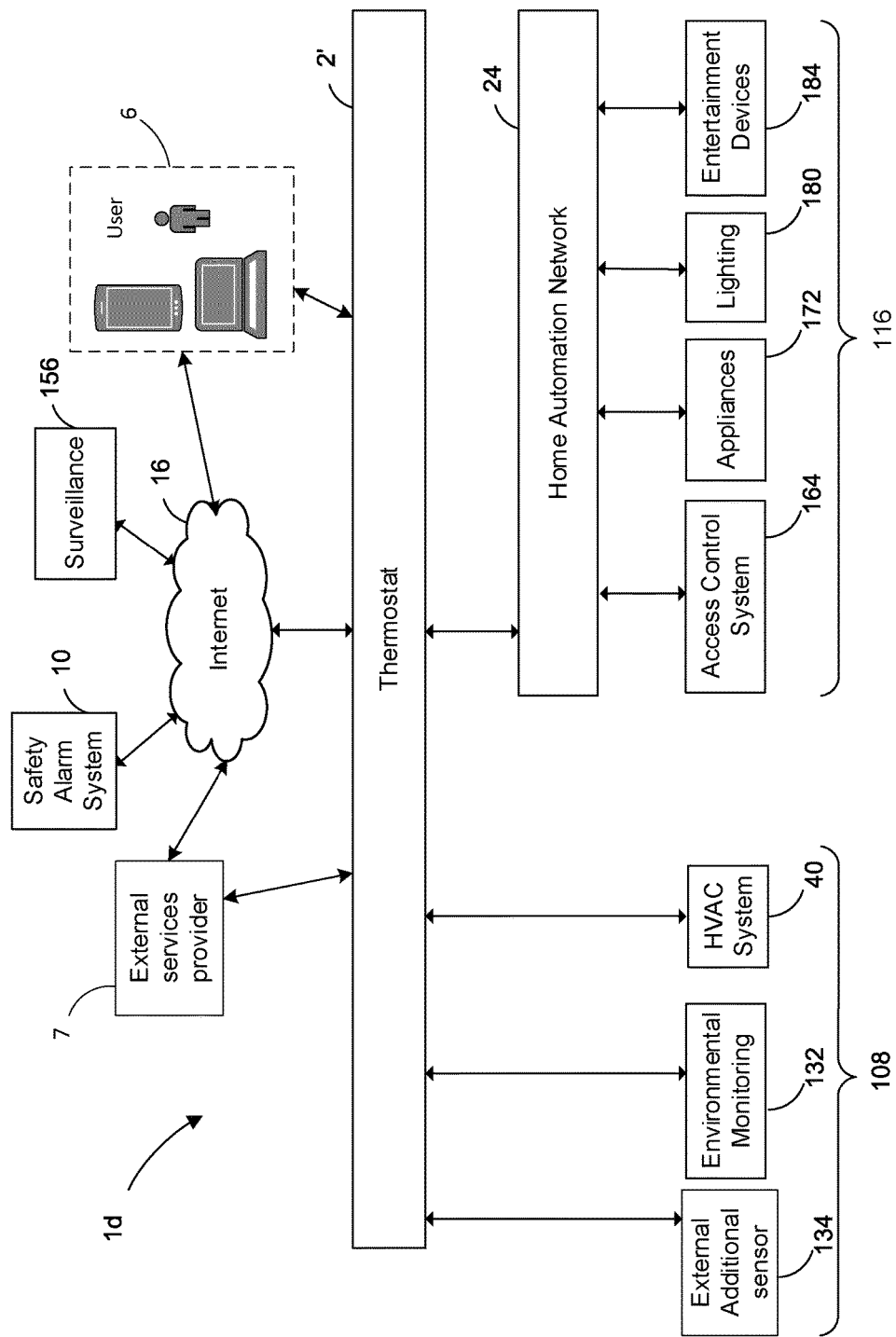
FIG. 10 illustrates a schematic diagram of a home automation system according to one exemplary configuration.

Referring now to FIG. 10, therein illustrated is a schematic diagram of a home automation system 1*d* according to yet another exemplary configuration. According to this exemplary configuration, the home automated devices are in communication with the thermostat system according to a three-tier scheme. While the variant thermostat system 2' is illustrated, it will be understood that the thermostat system described with reference to FIG. 2 may also be used within the three-tier scheme.

As illustrated, the first subset of the home automated devices includes the external environmental monitoring device 132, the external additional sensor 134 and the HVAC system 40. These home automated devices are directly connected home automated devices 108 and represent the first tier of communication with the thermostat system.

The second subset of the home automated devices includes the access control system 164, appliances 172, lighting device 180 and entertainment 184. These home automated devices are networked connected home automated devices 116 that communicate with the thermostat system 2' via the home automation network 24 and represent the second tier of communication with the thermostat system.

The third subset of the home automated devices include at least one device that communicate with the thermostat system via the wide area network 16 and represent the third tier of communication with the thermostat system. For example, the at least one home automated device of the third subset is not operable to communication over a home automation network 24 (ex: does not have appropriate network protocol). Alternatively, the at least one home automated device of the third subset is located at a distance from the thermostat system 2' that is greater than the maximum operational range of the network protocol of the home automation network. However, the thermostat system may still access the at least one home automated device of the third subset via the wide-area network 16. As illustrated, and for example purposes, the safety alarm system 10 and the surveillance system 156 are connected to the thermostat system via the internet 16. For example, the thermostat system 2' can receive a status of the security system, which can be further displayed on the display 88 of the thermostat system 2. For example, a video stream of video captured by the surveillance system 156 may be displayed on the display 88 of the thermostat system 2'.

In many cases, users are primarily concerned with a higher level of automated control of the HVAC system while being less interested in automation of other devices within the house. Accordingly, these users may be interested in acquiring an automated thermostat system without having to acquire a full featured home automation system. Advantageously, according to various exemplary embodiments wherein the thermostat system includes an internal HVAC interface 36, the thermostat system 2, or 2' described herein according to various exemplary embodiments is ready to use as a thermostat for controlling the HVAC system.

However, such users may at a later stage be interested to progressively add more automation of other devices within the building. Advantageously, the local area communication module 20 and the second control module 72 of the thermostat system 2 or 2' described herein according to various exemplary embodiments may be used to provide automated control of additional home automated devices 116 via a home automation network 24.

It will be appreciated that various exemplary thermostat systems described herein allow for flexible configuration of a home automation system. Furthermore, the thermostat system is configured to access home automated devices in at least two ways. Moreover, the thermostat system is configured to make available to a user information pertaining to the home automated devices in various ways.

For example, environmental conditions surrounding the thermostat system can be sensed using the internal environment monitoring module 44. According to some embodiments, environmental conditions can also be sensed using a directly connected environment monitoring module 132. According to yet other embodiments, environmental conditions can be sensed using a network connected external monitoring module 132. In each case, the information may be displayed on the display 88 of the thermostat system 2 and/or transmitted to a remote user device via the wide area communication module 8.

For example, various exemplary embodiments wherein the thermostat system includes an internal HVAC interface 36 are configured to be hardwired to a HVAC system 40. As described, the HVAC system 40 can be accessed independently of a home automation network according to some exemplary embodiments described herein. The thermostat system is also configured to control HVAC system 40 by accessing an external HVAC interface 192 via the home automation network 24. In each case, commands for controlling the HVAC system may be inputted using the user input device 80 of the thermostat system and/or transmitted from a remote user devices to the thermostat system via the wide-area network 16.

For example, and as described, various exemplary thermostat systems are configured to access one or more home automated devices that pertain to non-environmental conditions. As described herein, these home automated devices may be accessed according to a three-tier access. In the first tier, one or more home automated devices may be directly connected to the thermostat system to be controlled by and/or provide information to the thermostat system. In the second tier, one or more home automated devices may be networked connected to the thermostat system to be controlled by and/or provide information to the thermostat system. In the third tier, one or more home automated devices may be connected to the thermostat system to be controlled by and/or provide information to the thermostat system via the wide-area network 16. In each case, information pertaining to one or more non-environmental home automated devices may be displayed on the display 88 of the thermostat system 2 and/or transmitted to a remote user device via the wide area communication module 8. Similarly commands for controlling one or more non-environmental home automated devices may be inputted by a user using the user input device 80 and/or transmitted from a remote user device to the thermostat system via the wide-area network 16.

Figure 11:
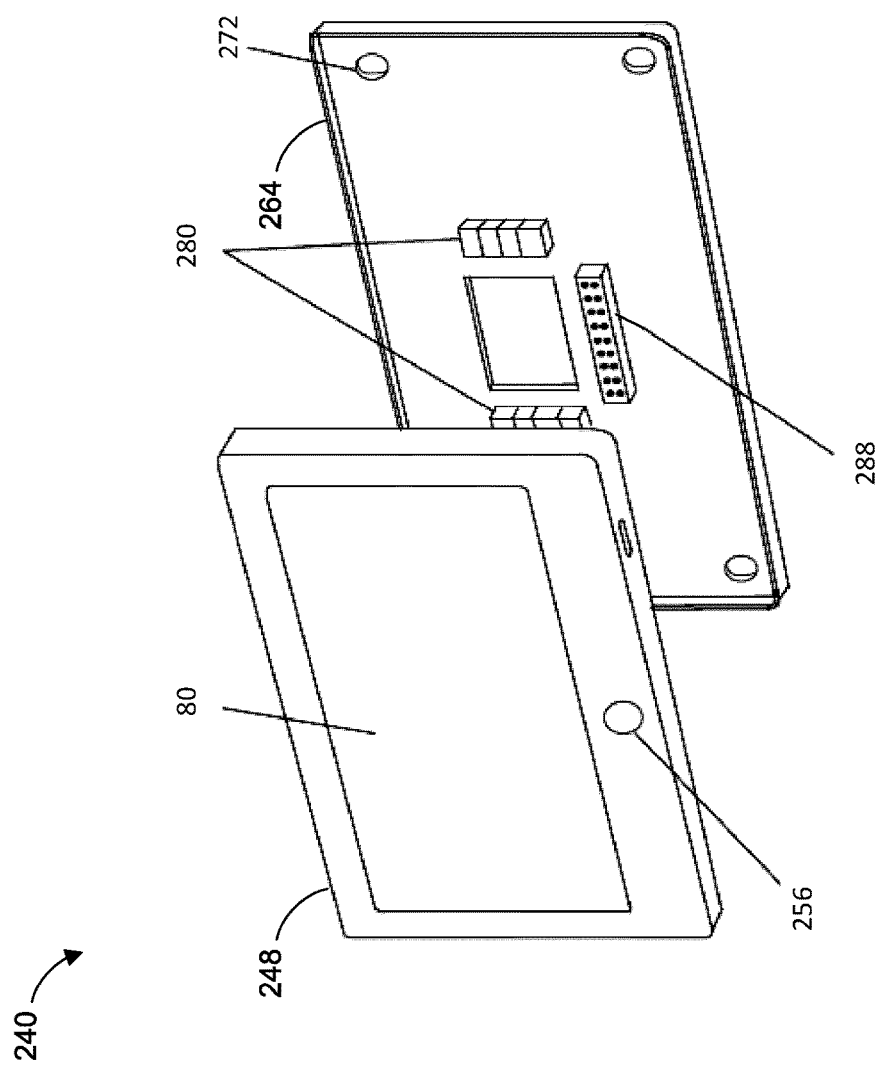
FIG. 11 illustrates an exploded view of a thermostat system being provided in an enclosure according to one exemplary embodiment.

Referring now to FIG. 11, therein illustrated is a perspective view of a packaged thermostat system 2 having been packaged within an enclosure 240 according to various exemplary embodiments. For example, and as illustrated, the enclosure 240 has a form factor that is similar to the form factor of a traditional thermostat. The enclosure 240 includes a face plate 248 having the display 80, which may be a touchscreen providing the user input device 88. The face plate 248 may further include an occupancy sensor for detecting the presence of a human user. For example, various operations of the thermostat system 2 may be controlled based on whether the presence of the human user is detected.

The enclosure 240 further includes a back panel 264. The back panel 264 includes mounts 272 for receiving fasteners for mounting the back panel 264 onto a vertical surface, such as the surface of the wall. Accordingly, the enclosure 240 may be mounted onto a vertical wall like a traditional thermostat. The back panel 264 further includes one or more HVAC wire connectors 280, which provide the physical connection of the wires of the HVAC system 40 with the ports of the HVAC interface 36.

The back panel 264 further includes a board-to-board connector 288 for electronically connecting hardware components provided on the back panel 264 with the hardware components provided on the front panel 256. For example, the hardware components on which the thermostat system 2 is implemented may be provided on the front panel 256, on the back panel 264 or dispersed amongst the front panel 256 and the back panel 264. The board-to-board connector 288 provides communication between the components on the front panel 240 and the back panel 264 as well as power.

Figure 12:
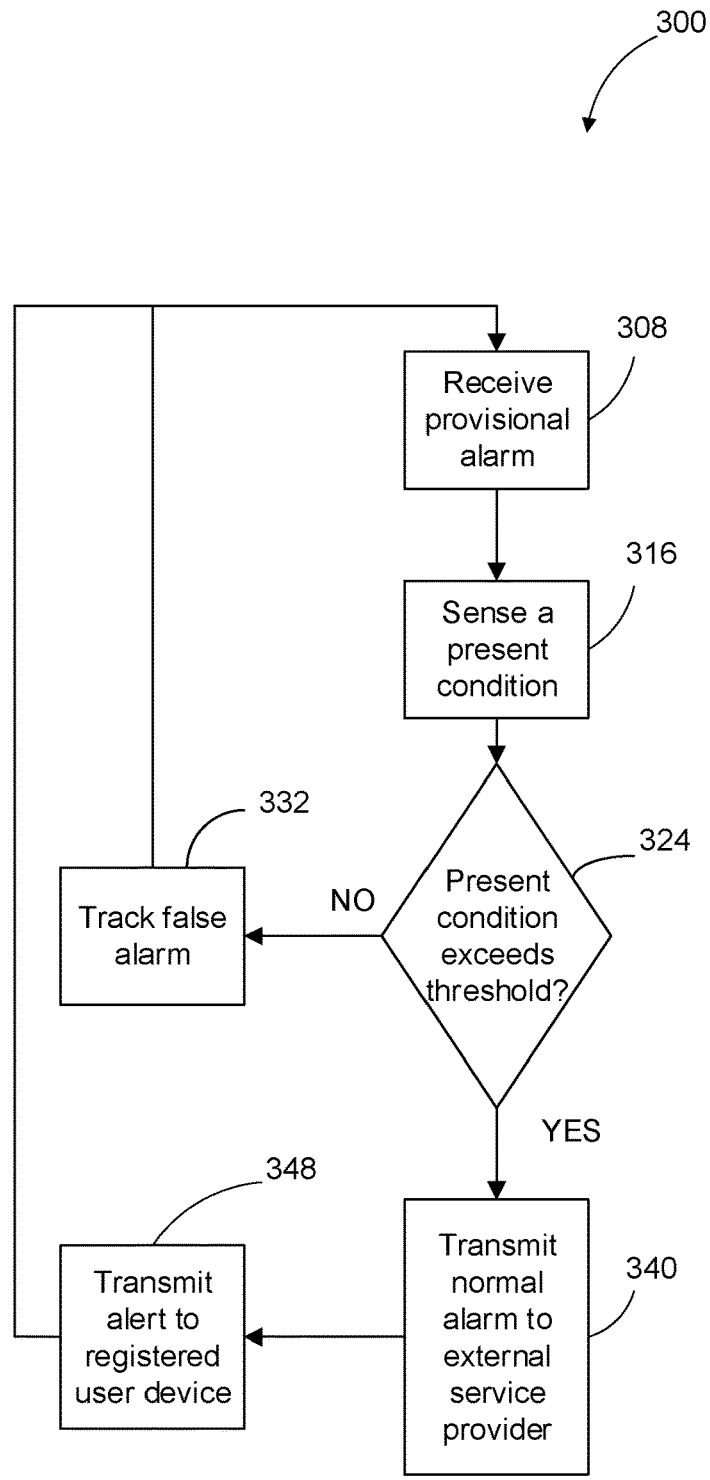
FIG. 12 illustrates a flowchart showing the operational steps of an exemplary method for determining a false alarm.

Referring now to FIG. 12, therein illustrated is a flowchart showing the operation steps of an example method 300 for determining a false alarm. The example method 300 may be carried out on the controller 32 of the thermostat system 2 or variant thermostat system 2'.

At step 308, a provisional alarm is received from the safety alarm system 10. As described elsewhere, the safety alarm system 10 includes at least one sensor 14 and is operable to raise at least one alarm in response to a change in condition being sensed by the at least one sensor 14. For example, an alarm is raised when the change in condition sensed by the sensor 14 of the safety alarm system 10 is substantial so as to represent a situation where further intervention may be required. Intervention can include further investigation by a user of the condition or the dispatching of one or more appropriate servicepersons.

The provisional alarm indicates a type of alarm that is occurring. For example, the type of alarm may be indicated by indicating the type of the condition that was sensed by a sensor 14 of the safety alarm system 10 that causing triggering of the provisional alarm. The safety alarm system 10 may be a directly connected home automated device or a network connected home automated device. Accordingly, the provisional alarm transmitted by the safety alarm system 10 is received at the thermostat 2 directly, via the home automat network 24 or via the wide area network 16.

An alarm raised by the safety alarm system 10 is treated within the home automation system 1 as a provisional alarm. It will be understood that the alarm triggered by the safety alarm system 10 is characterized as being "provisional" because the provisional alarm may represent a false alarm.

The term "false alarm" herein refers to a situation where the change in condition sensed by the safety alarm system 10 initially appears to be sufficiently serious so as to require further invention, but is subsequently determined to not be sufficiently serious. Therefore, further intervention is not initiated in response to a false alarm.

By contrast, a "true alarm" herein refers to a situation where a provisional alarm is determined to be sufficiently serious so as to require further intervention.

A provisional alarm that is determined to be a false alarm is not transmitted to the external service provider 7. A "provisional alarm" that is deemed to be a true alarm may be transmitted to the external service provider 7 or may trigger the transmitting of another alarm to the external service provider 7.

Continuing with FIG. 12, at step 316, the present condition is sensed. The present condition is sensed at a location in proximity of the sensor 14 of the safety alarm system 10 that triggered the provisional alarm received at step 308. A location is considered to be in proximity of the sensor of the safety alarm system 10 if the change in condition sensed by the sensor 14 of the safety alarm system 10 may also cause a change in the present condition of a corresponding type at that location. Proximity for various types of conditions are further described in the examples disclosed herein.

The present condition at the location in proximity of the sensor of the safety alarm system 10 may be sensed by at least one additional sensor that is independent of the safety alarm system 10. The at least one additional sensor being independent of the safety alarm system 10 refers to the at least one additional sensor being external to the safety alarm system 10 and having a sensing mechanism that is separate from the sensing mechanism of the sensor 14 of the safety alarm system 10. For example, a defect to a sensor of the safety alarm system 10 that would cause a sensing of a change in condition would not affect the at least one additional sensor that is independent of the safety alarm system 10. For example, tampering of the safety alarm system 10 so as to cause the triggering of a provisional alarm would not affect the at least one additional sensor, unless the additional sensor was also separately tampered with.

The type of the present condition sensed at step 316 corresponds to the type of alarm or type of condition indicated by the provisional alarm signal received at step 308. Accordingly, the type of present condition that is sensed at step 316 may vary depending on the type of alarm or type of condition that is indicated by the received provisional alarm signal. The type of the present condition corresponds to the type of alarm or type of condition sensed by the safety alarm system 10 in that information pertaining to the present condition sensed at step 316 provides some information as to characteristics of the condition sensed by the sensor 14 of the safety alarm system 10 that led to triggering of a provisional alarm. For example, the type of the present condition may be the same as the type of condition indicated by the provisional alarm signal. However, it will be understood that type of the present condition sensed by the additional sensor may be different from the type of condition indicated by the provisional alarm signal. For example, where a first condition is the presence of smoke, indicating a possible presence of fire, a second condition that is temperature corresponds to the first condition because the presence of fire is typically accompanied with a rise in ambient temperature.

According to various exemplary embodiments, at least one additional sensor that is independent of the safety alarm system 10 may include at least one sensor that is a home automated device. The at least one home automated sensor may be network connected or directly connected to the thermostat system 2. For example, as illustrated in FIG. 6, the thermostat system 2' includes a sensor interface 204d for communicating with an external environmental monitoring module 132 and an external additional sensor 134.

According to various exemplary embodiments, at least one additional sensor that is independent of the safety alarm system 10 may include a sensor that is internal or embedded in the thermostat system 2. For example, and as illustrated in FIG. 2, the at least one additional sensor may be provided as part of the environmental monitoring module 44. Continuing with FIG. 2, the internal additional sensor 45 may also be used at step 316 to sense the present condition at the location in proximity of the safety alarm system 10.

According to various exemplary embodiments, the at least one additional sensor that may potentially be operated at step 316 may include at least one sensor that is a home automated device and at least one sensor that is internal or embedded in the thermostat system 2.

Accordingly, sensing the present condition at step 316 includes controlling the at least one additional sensor so as to sense the present condition of a type corresponding to the type of alarm or type of condition indicated by the provisional alarm. The at least one additional sensor that is controlled at step 316 is operable to sense the type of condition corresponding to the type of alarm or type of condition indicated by the provisional alarm system. For example, where the corresponding at least one additional sensor is a home automated device, the second control submodule 72 generates a control signal to control that sensor to sense the present condition of the corresponding type. For example, where the appropriate at least one additional sensor is a directly connected device or an internal or embedded sensor, the first control submodule 64 generates a control signal to control that sensor to sense the present condition of the corresponding type.

Referring back to FIG. 12, at step 324, it is determined whether the present condition sensed at step 316 exceeds a predetermined threshold for that type of condition. The predetermined threshold for the give type of condition may represent a level for that condition where further intervention is required.

If the level of the present condition in proximity of the sensor of the safety alarm system does not exceed the predetermined threshold, it is determined that the provisional alarm represents a false alarm. For example, the method 300 may return to step 308 to await receiving another provisional alarm from the safety alarm system 10. According to some exemplary embodiments, the method 300 may further include storing at step 332 a record of the false alarm. For example, the stored record of the false alarm may include information pertaining to the provisional alarm (e.g. the type of condition and/or an amount of the change in the condition that was sensed) and/or information pertaining to the present condition sensed by the at least one additional sensor independent of the safety alarm system (e.g. the type of present condition and/or a level of the present condition sensed).

If the level of the sensed present condition in proximity of the sensor 14 of the safety alarm system 10 exceeds the predetermined threshold, it is determined the provisional alarm represents a true alarm. Accordingly, the method 300 proceeds to step 340 to transmit a normal alarm signal to the external service provider 7. The normal alarm signal may resemble an alarm signal typically transmitted by a typical safety alarm system 10 known in the art. For example, the normal alarm signal may include information so as to permit the external service provider 7 to respond to the normal. The normal alarm signal may include information indicating the type of alarm or type of condition for which intervention is required. The normal alarm may also include information indicating the level of the present condition sensed by the addition al sensor and/or the level of the condition sensed by the sensor 14 of the safety alarm system 10. The external service provider 7 may then dispatch the appropriate servicepersons (e.g. firefighters, health works, security force, police force) according to the indicated type of alarm or type of condition sensed.

The normal alarm signal may be transmitted from thermostat system 2 using the wide area communication module 8 via the wide area network 16. The normal alarm signal may be transmitted from the thermostat system 2 over the dedicated connection.

According to various exemplary embodiments, in addition to the transmitting the normal alarm signal, the method 300 also includes the transmitting to a registered user device 6 at step 348 an alert with information pertaining to the normal alarm signal. For example, the alert may include information indicating the type of alarm or type of condition for which intervention is required. The alert may also include information indicating the level of the present condition sensed and/or the level of the condition sensed by the sensor 14 of the safety alarm system. The alert may be sent to the registered remote user device 6, using the wide area communication module 8 via the wide area network 16 or via a local area network.

After transmitting the normal alarm to the external service provider 7 at step 340, the method 300 may return to step 308 to await receiving another provisional alarm from the safety alarm system 10.

Figure 13:
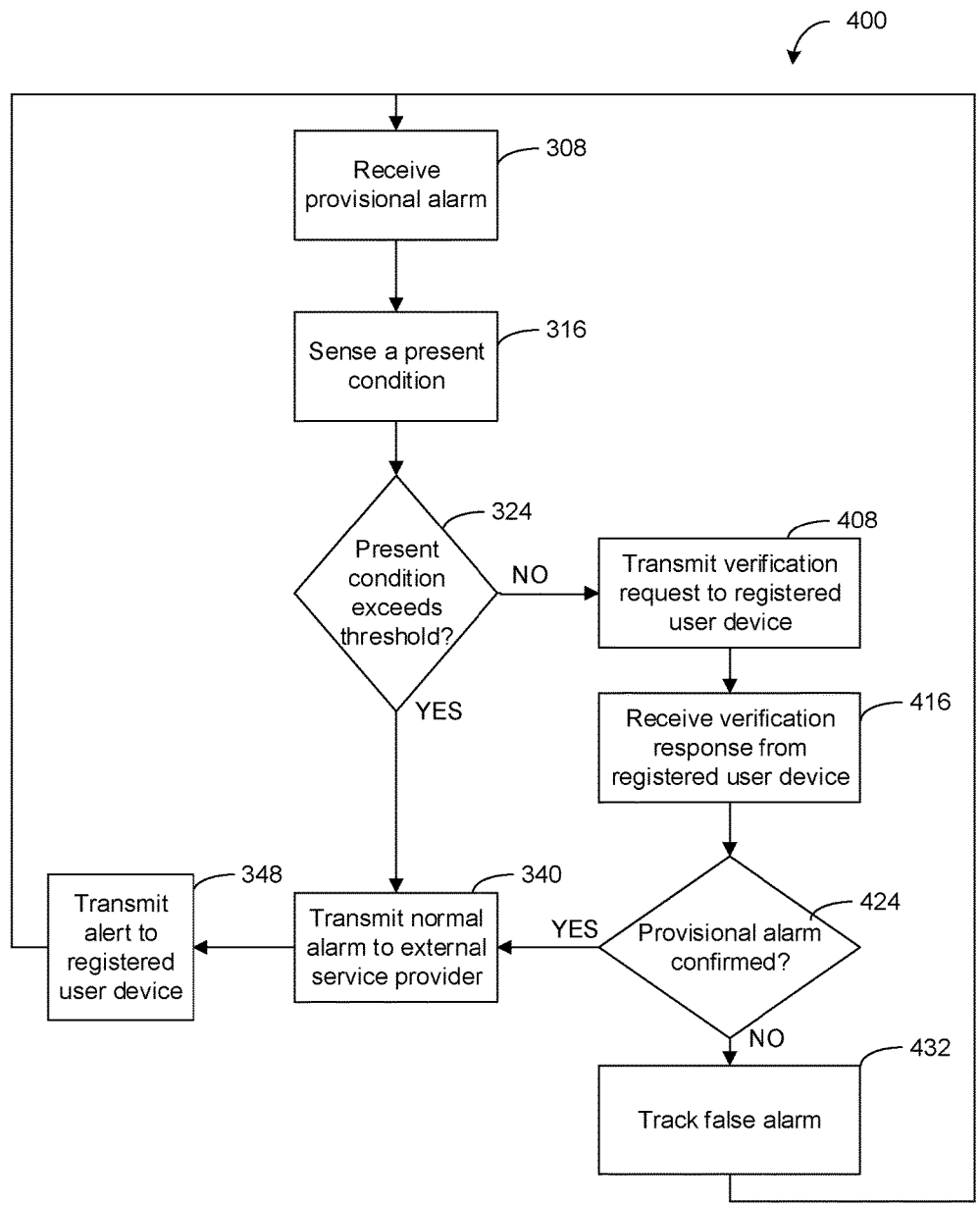
FIG. 13 illustrates a flowchart showing the operational steps of an another exemplary method for determining a false alarm.

Referring now to FIG. 13, therein illustrated is a flowchart showing the operation steps of an example method 400 for determining a false alarm with user verification. The example method 400 may be carried out on the controller 32 of the thermostat system 2 or variant thermostat system 2'.

The example method 400 is a variant of the example method 300 and also includes the steps 308, 316 and 324, as described herein with reference to the example method 300.

Furthermore, like the example method 300, if the level of the present condition in proximity of the sensor of the safety alarm exceeds the predetermined threshold, it is also determined within the example method 400 that the provisional alarm represents a true alarm. Similarly, at step 340 of method 400, a normal alarm signal is transmitted to the external service provider 7. Furthermore, an alert with information pertaining to the normal alarm signal may also be transmitted to a user device at step 348.

According to the example method 400, if the level of the present condition in proximity of the sensor 14 of the safety alarm system 10 does not exceed the predetermined threshold, the method 400 proceeds to step 408 to transmit a verification request to at least one remote user device 6 registered with the thermostat system 2. According to some examples, the verification request may be transmitted to each of the remote user devices 6 registered with the thermostat system 2.

The verification request may be transmitted from the thermostat system 2 to one or more remote user devices 6 via the wide area network 16 or via a local area network.

The verification request transmitted at step 408 includes information pertaining to type of alarm indicated in the provisional alarm and/or the change in condition sensed by the sensor 14 of the safety alarm system 10. For example, the verification request may include the sensed level of the condition, the amount of the change in the condition, the rate of the change in the condition, and/or the type of the condition sensed by the sensor 14 of the safety alarm system 10.

The verification request may also include information pertaining to the present condition sensed by the at least one additional sensor located in proximity of the sensor 14 of the safety alarm system 10. For example, the verification request may also include the sensed level of the present condition, the amount of the change in the present condition, the rate of the change in the present condition, and/or the type of the condition sensed by the sensor of the safety alarm system 10.

Figure 14:
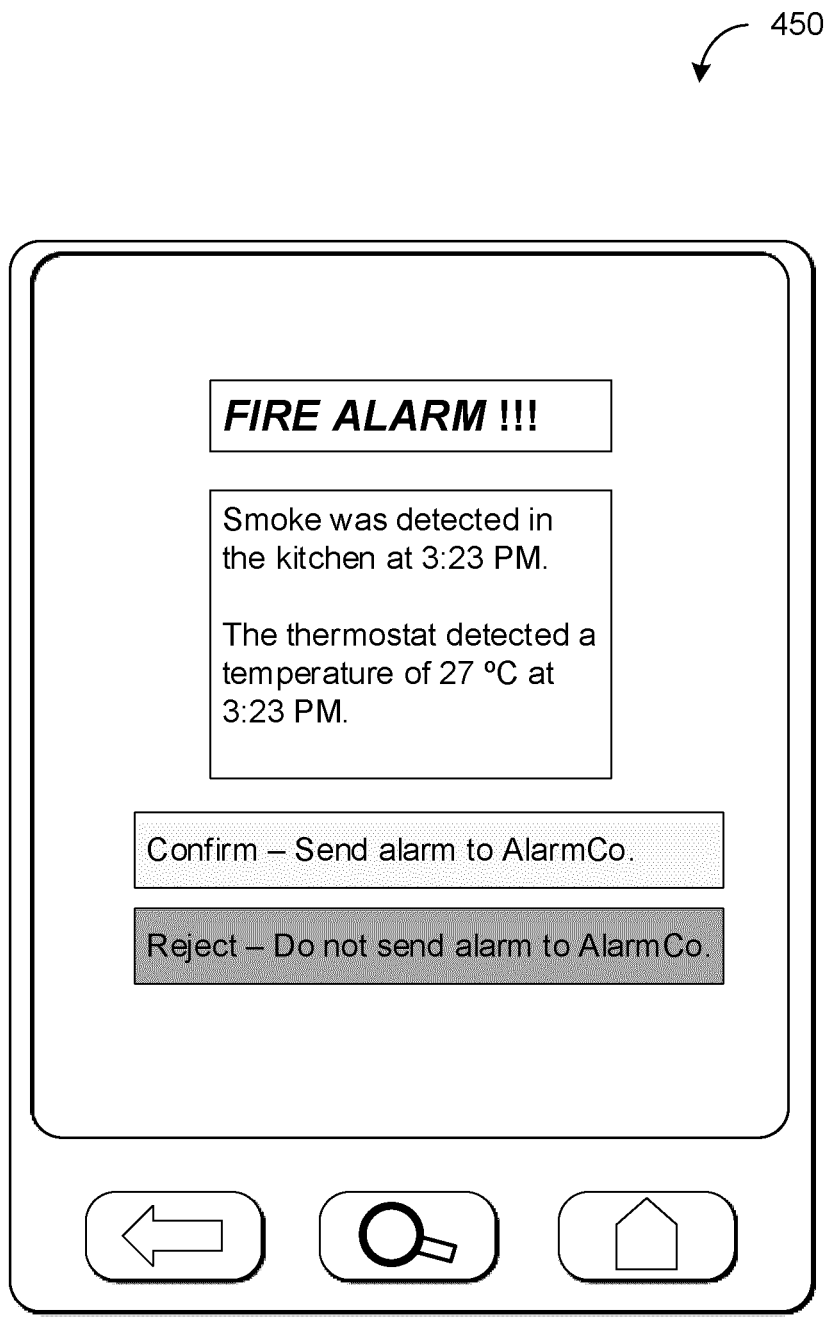
FIG. 14 illustrates a block diagram of an exemplary verification interface.

In response to receiving a verification request at a remote user device 6, an appropriately configured remote user device 6 displays an alarm verification interface. FIG. 14 illustrates exemplary alarm verification interface 450. The alarm verification interface may include information pertaining to the type of alarm, the condition sensed by the safety alarm system 10 and/or the present condition sensed by the at least one additional sensor that is independent of the safety alarm system 10.

A user may interact with the remote user device 6 to respond to the verification request by confirming the provisional alarm or rejecting the provisional alarm. For example, the interface 450 further includes a prompt for the user to provide an interaction confirming the provisional alarm or rejecting the provisional alarm.

The response generated from the user interacting with the remote user device 6 is transmitted as a verification response. The response indicates whether the user chose to confirm the provisional alarm or reject the provisional alarm.

At step 416, the verification response is received. For example, the verification response is received at the thermostat system 2 from the remote user device 6 over the wide area network 16 or a local area network.

At step 424, it is determined whether the verification request indicates that the user chose to confirm the provisional alarm or to reject the provisional alarm.

If the verification request received at step 416 indicates that the provisional alarm is confirmed, the method proceeds to step 340 to transmit the normal alarm signal to the external service provider 7. It will be appreciated that receiving a verification request that indicates user confirmation of the provisional alarm results in a normal alarm signal being transmitted to the external service provider 7 despite of the level of the present condition sensed by the at least one additional sensor not exceeding the predetermined threshold. For example, through interaction with the remote user device 6 in response to receiving a verification request, the user may act to override a determination made by the thermostat system 2. It will be appreciated that without user interaction, the method 400 would have determined at step 324 that the provisional alarm received at 308 represents a false alarm. However, by having the user provide a confirmation of the provisional alarm with the verification response received at step 416, the provisional alarm ends ups being confirmed as a true alarm, thereby resulting in transmission of the normal alarm to the external service provider 7 at step 340.

If the verification request received at step 416 indicates that the provisional alarm is to be rejected, the method 400 proceeds back to step 308 to await receiving another alarm. According to some exemplary embodiments, the method 400 may further include storing at step 432 a record of the false alarm. For example, the stored record of the false alarm may include information pertaining to the provisional alarm (e.g. the type of condition and/or an amount of the change in the condition that was sensed) and/or information pertaining to the present condition sensed by the at least one additional sensor independent of the safety alarm system (e.g. the type of present condition and/or a level of the present condition sensed).

Proceeding back to step 308 represents a situation where a user has verified the information received at a remote user device 6 pertaining to the provisional alarm and has decided that the provisional alarm represents a false alarm. As a result, a normal alarm should not be transmitted to the external service provider 7.

According to various exemplary embodiments, the provisional alarm received at the thermostat system 2 indicates that an alarm of the intrusion type has been triggered. Intrusion corresponds to an unauthorized entry or presence of a person or object.

For example, the intrusion type may be indicated by indicating that a condition of an entry point detection device has changed. The entry point detection device may be any device that detects whether a mechanism for blocking or unblocking an entry point has been used. For example, a mechanism for blocking or unblocking an entry point may be a door (the corresponding entry point being a doorway) or a window frame (the corresponding entry point being a window). For example, the entry point detection device may be a proximity switch for determine the position (blocking or unblocking) of the mechanism. For example, the proximity switch may be implemented using reed switches.

For example, the intrusion type may also be indicated by indicating that a status of a first occupancy sensor of the safety alarm system 10 has changed. For example, this change may correspond to the first occupancy sensor detecting presence of a person or object in a given area.

In response to receiving a provisional alarm indicating the presence of an intrusion alarm (type of alarm) and/or the state of the entry point detection device (a type of condition) or the state of the first occupancy sensor (a type of condition), the controller 32 of the thermostat system 2 generates a control signal to control an additional sensor located in proximity of the sensor 14 of the safety alarm system 10 to sense a present condition of a type that corresponds to the intrusion alarm, state of the entry point detection device or state of the first occupancy sensor.

According to various exemplary embodiments, the additional sensor controlled for sensing the present condition in proximity of the sensor 14 of the safety alarm system 10 may be any sensor operable to detect presence of a person or object, such as an occupancy sensor of the additional internal sensor 45 of the thermostat system or an occupancy sensor of the external additional sensor 134.

Where the additional sensor is an occupancy sensor, the additional sensor is considered in proximity of the sensor 14 of the safety alarm system 10 if the additional sensor is located at a location where a potential intrusion sensed by the sensor 14 of the safety alarm system 10 may also cause detection of the presence of a person of object by the additional sensor. For example, the line of sight of the additional sensor that is an occupancy sensor covers an area that includes an entry point monitored by the entry point detective device. For example, the line of sight of the additional sensor that is an occupancy sensor covers an area that overlaps with the line of sight of the first occupancy sensor 14 of the safety alarm system 10. For example, line of sight of the additional sensor that is an occupancy sensor covers an area that any intruder must necessarily enter after having accessed the entry point monitored by the entry point detection device or after having crossed an area covered by the line of sight of the first occupancy sensor 14 of the safety alarm system 10.

According to one exemplary embodiment, the additional sensor may sense the presence a person or object and the predetermined threshold corresponds to the presence of a person or object within the line of sight of the occupancy sensor (e.g. change from lack of a person or object to presence of person or object).

The occupancy sensor may further distinguish amongst between adults, children and pets. The occupancy sensor may further determine the number of people detected and/or the direction of their movement. Accordingly, the predetermined threshold may be a particular person detected, a number of persons, or a speed of movement.

Figure 15:
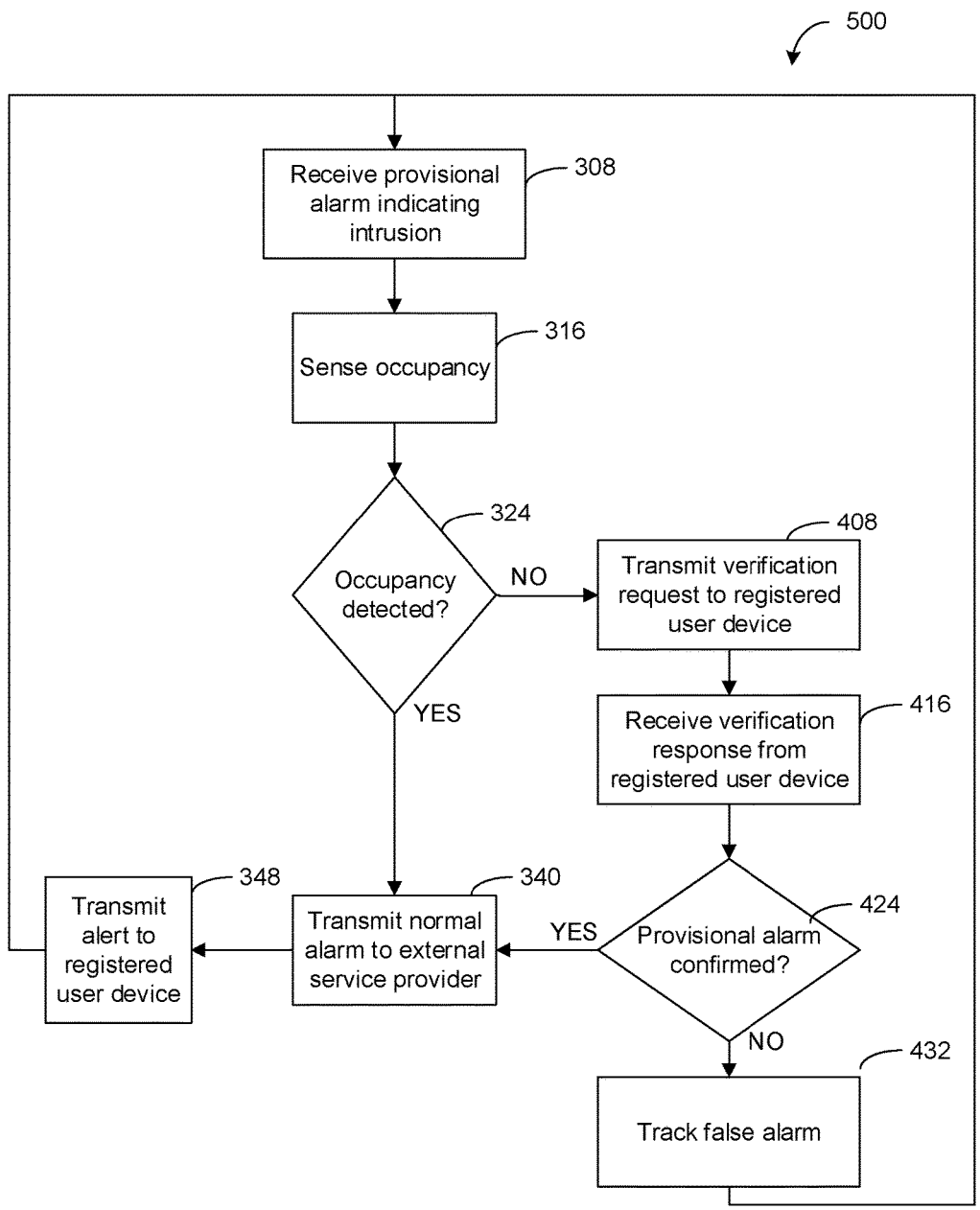
FIG. 15 illustrates a flowchart showing the operational steps of an exemplary method for determining a false alarm of the intrusion type.

Referring now to FIG. 15, therein illustrated is an example method 500 for determining an intrusion alarm. It will be appreciated that an example method 500 represents an exemplary embodiment of method 400 applied specifically for the context an intrusion alarm. The description provided herein with respect to example methods 300 and 400 are also applicable to method 500, where appropriate.

In particular, according to example method 500, at step 308, a provisional alarm indicating an intrusion alarm is received. At step 316, a present condition of a type corresponding to the intrusion alarm is sensed. As described herein, the present condition may be the presence of person or object. At step 324, it is determined whether the presence of a person or object has actually been detected by the additional sensor that is an occupancy sensor.

According to various exemplary embodiments, the provisional alarm received at the thermostat system 2 indicates that an alarm of the fire alarm type has been triggered.

For example, the fire alarm type may be indicated by indicating that a condition (e.g. status) of an actuator of a user-operated fire alarm device has been actuated. For example, this condition may correspond to a user pulling the actuator (e.g. lever) of a user-operated fire alarm device, such as a wall-mounted fire alarm device. The user-operated fire alarm may be coupled to the safety alarm system 10, wherein a sensor 14 of the safety alarm system 10 monitors the state of the actuator of the user-operated fire alarm device that triggers the fire alarm.

For example, the fire alarm type may also be indicated by indicating that a condition of amount of smoke has changed. For example, this change in the quantity of smoke may be sensed by a smoke detector sensor 14 of the safety alarm system 10.

In response to receiving a provisional alarm indicating the presence of a fire alarm (type of alarm) and/or the state of the actuator of a fire alarm device (a type of condition) or the level of smoke detected (a type of condition), the controller 32 of the thermostat system 2 generates a control signal to control an additional sensor located in proximity of the sensor 14 of the safety alarm system 10 to sense a present condition of a type that corresponds to the fire alarm, state of the actuator, or level of smoke detected.

According to various exemplary embodiments, the additional sensor controlled for sensing the present condition in proximity of the sensor 14 of the safety alarm system 10 may be any sensor operable to detect presence of smoke. The additional sensor may include the environmental monitoring module 44, a smoke detector of the additional internal sensor 45, an external environmental monitoring module 132 being a home automated device or a smoke detector of the external additional sensor 134.

Where the additional sensor is a sensor operable to detect presence of smoke, the additional sensor is considered in proximity of the sensor 14 of the safety alarm system 10 if the additional sensor is located at a location where a potential fire sensed by the sensor 14 of the safety alarm system 10 can cause presence of smoke at the location of the additional sensor.

According to one exemplary embodiment, the additional sensor may sense the presence of smoke and the predetermined threshold corresponds to the presence of smoke (e.g. change from state of lack of smoke to state of smoke being present).

According to one exemplary embodiment, the additional sensor may sense a level of smoke and the predetermined threshold corresponds to a predetermined level or amount of smoke.

According to one exemplary embodiment, the additional sensor may sense a rate of change in the level of smoke and the predetermined threshold corresponds to a predetermined rate of change in the level of smoke.

According to various exemplary embodiments, the additional sensor controlled for sensing the present condition in proximity of the sensor 14 of the safety alarm system 10 may be a temperature sensor. The temperature sensor may be provided as part of the environmental monitoring module 44, a temperature sensor of the additional internal sensor 45, an external environmental monitoring module 132 being a home automated device or a temperature sensor of the external additional sensor 134.

Where the additional sensor is a temperature sensor, the additional sensor is considered in proximity of the sensor 14 of the safety alarm system 10 if the additional sensor is located at a location where a potential fire sensed by the sensor 14 of the safety alarm system 10 can cause a change in temperature at the location of the additional sensor.

According to one exemplary embodiment, the additional sensor being a temperature sensor may sense a present temperature and the predetermined threshold corresponds to a predetermined temperature setpoint.

According to one exemplary embodiment, the additional sensor being a temperature sensor may sense a rate of change of the temperature and the predetermined threshold corresponds to a predetermined rate of change in temperature.

Figure 16:
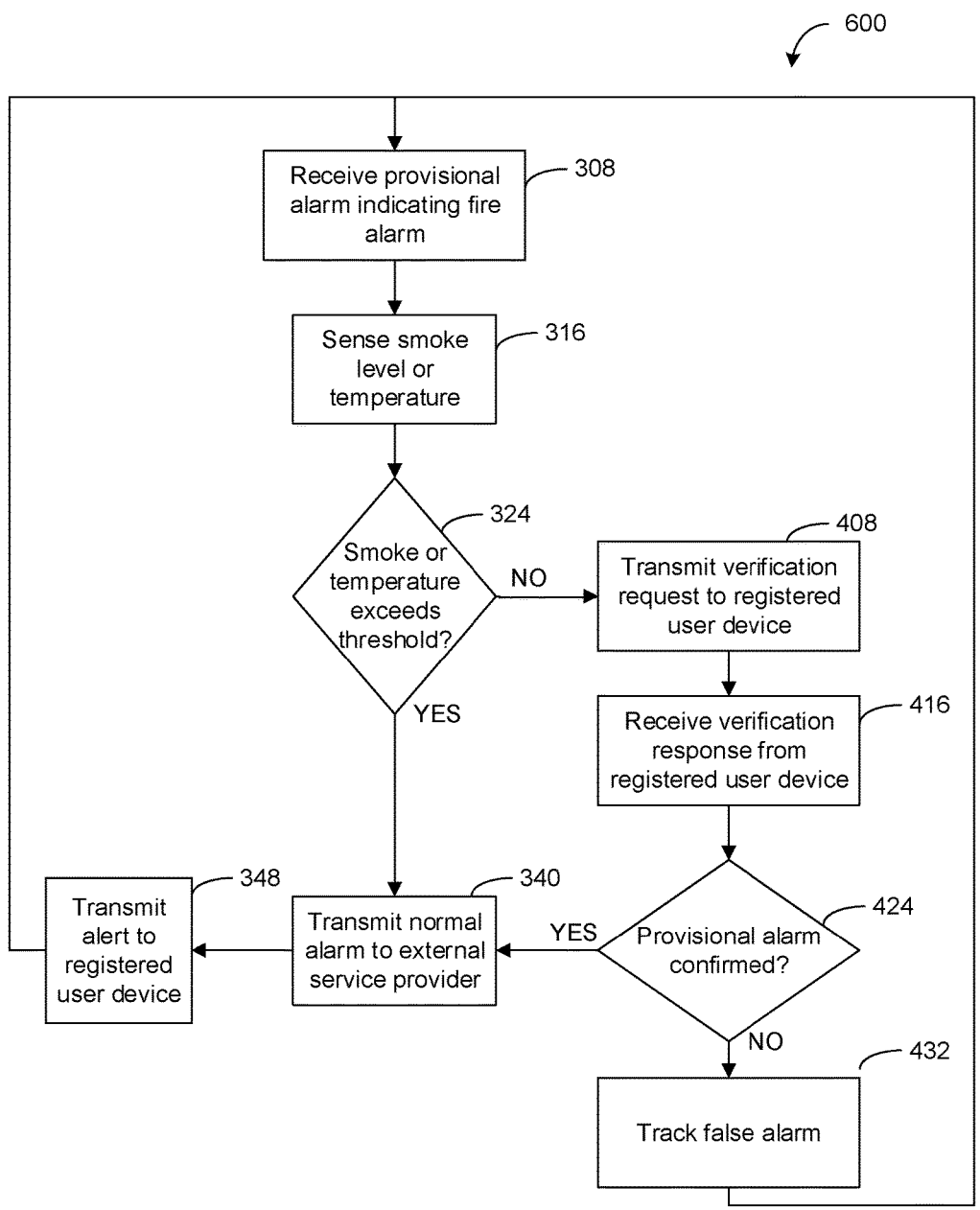
FIG. 16 illustrates a flowchart showing the operational steps of an exemplary method for determining a false alarm of the fire alarm type.

Referring now to FIG. 16, therein illustrated is an example method 600 for determining a false fire alarm. It will be appreciated that an example method 600 represents an exemplary embodiment of method 400 applied specifically for the context a fire alarm. The description provided herein with respect to example methods 300 and 400 are also applicable to method 600, where appropriate.

In particular, according to example method 600, at step 308, a provisional alarm indicating a fire alarm is received. At step 316, a present condition of a type corresponding to a fire alarm is sensed. As described herein, the present condition may be one or more of presence of smoke, level of smoke, rate of change of the level of smoke, temperature and rate of change of the temperature. At step 324, the sensed present condition is compared to a predetermined threshold corresponding to that type of present condition.

According to various exemplary embodiments, the provisional alarm received at the thermostat system 2 indicates that an alarm of the dangerous gas type has been triggered.

For example, the dangerous gas type may be indicated by indicating a condition of the dangerous gas, such as a level of the dangerous gas or a rate of change of the dangerous gas.

In response to receiving a provisional alarm indicating the presence of a dangerous gas alarm (type of alarm) and/or condition of the dangerous gas (a type of condition), the controller 32 of the thermostat system 2 generates a control signal to control an additional sensor located in proximity of the sensor 14 of the safety alarm system 10 to sense a present condition of a type that corresponds to the dangerous gas alarm or condition of the dangerous gas.

According to various exemplary embodiments, the additional sensor controlled for sensing the present condition in proximity of the sensor 14 of the safety alarm system 10 may be any sensor operable to detect the same type of dangerous gas or a related type of gas. The related type of gas can be a type of gas that may be also be present at any time the dangerous gas is present. The addition sensor may be provided by the environmental monitoring module 44, a gas detector of the additional internal sensor 45, an external environmental monitoring module 132 being a home automated device or a gas detector of the external additional sensor 134.

Where the additional sensor is a gas detector operable to detect presence of a gas (the dangerous gas or a related type of gas), the additional sensor is considered to be in proximity of the sensor 14 of the safety alarm system 10 if the additional sensor is located at a location where presence of dangerous gas sensed by the sensor 14 of the safety alarm system 10 can cause presence of the same dangerous gas or the related typed gas at the location of the additional sensor.

According to one exemplary embodiment, the additional sensor may sense the presence of the same dangerous gas or a related type of gas and the predetermined threshold corresponds to the presence of the dangerous gas or the related type of gas (e.g. change from a state of lack of dangerous gas or related type of gas to state of dangerous gas or related type of gas being present).

According to one exemplary embodiment, the additional sensor may sense a level of the dangerous gas or a related type of gas and the predetermined threshold corresponds to a predetermined level or amount of the dangerous gas or the related type of gas.

According to one exemplary embodiment, the additional sensor may sense a rate of change in the level of the dangerous gas or related type of gas and the predetermined threshold corresponds to a predetermined rate of change in the level of the dangerous gas or in the level of the related type of gas.

Figure 17:
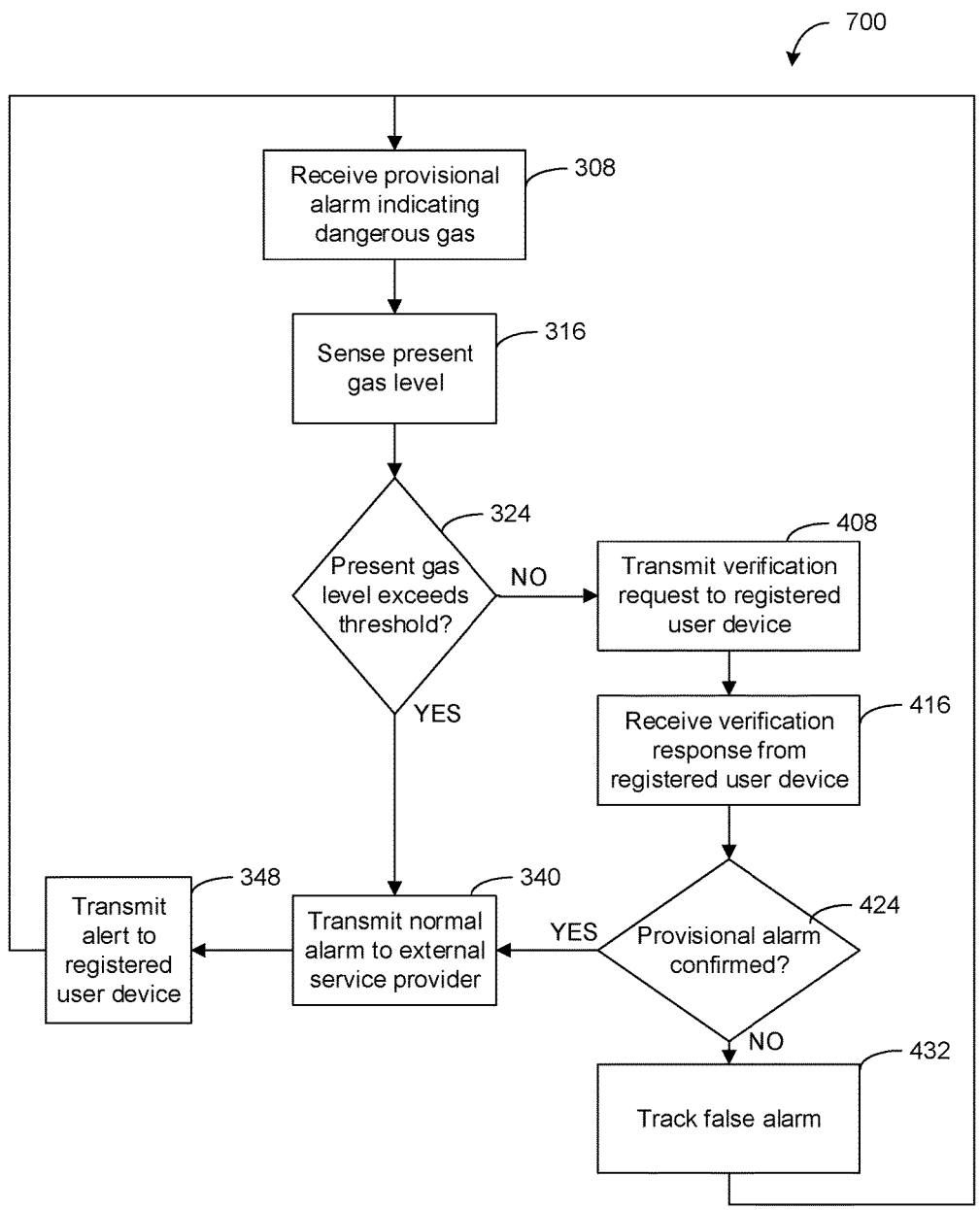
FIG. 17 illustrates a flowchart showing the operational steps of an exemplary method for determining a false alarm of the presence of gas type.

Referring now to FIG. 17, therein illustrated is an example method 700 for determining a dangerous gas alarm. It will be appreciated that an example method 700 represents an exemplary embodiment of method 400 applied specifically for the context a dangerous gas alarm. The description provided herein with respect to example methods 300 and 400 are also applicable to method 700, where appropriate.

In particular, according to example method 700, at step 308, a provisional alarm indicating a dangerous gas alarm is received. At step 316, a present condition of a type corresponding to a dangerous gas type is sensed. As described herein, the present condition may be one or more of presence of the dangerous gas or the related type of gas, level of the dangerous gas or the related type of gas and rate of change of the level of the dangerous gas or the related type of gas, At step 324, the sensed present condition is compared to a predetermined threshold corresponding to that type of present condition.

Figure 18:
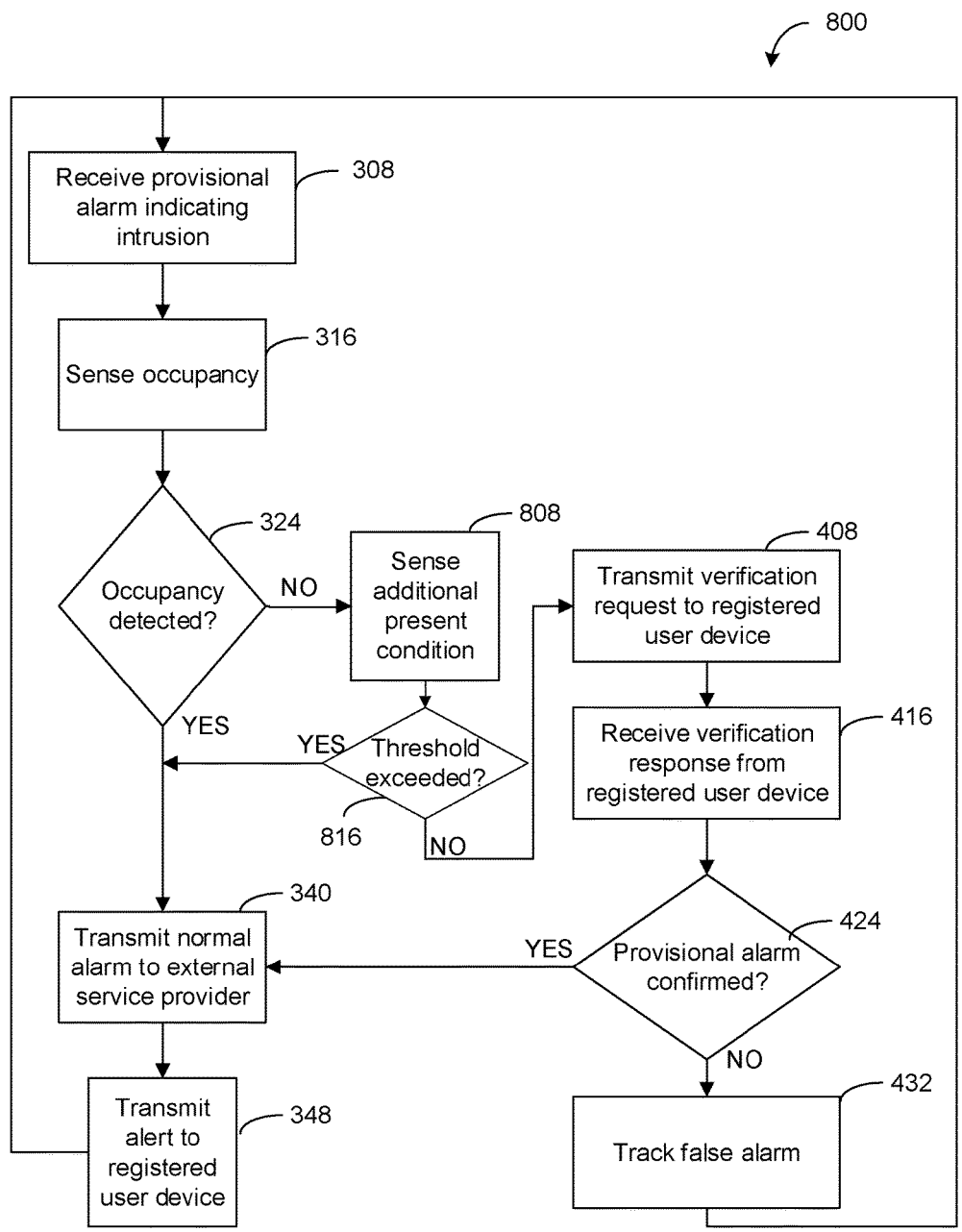
FIG. 18 illustrates a flowchart showing the operational steps of an exemplary method for determining a false alarm using a mixture of sensors.

Referring now to FIG. 18, therein illustrated is an example method 800 for determining an alarm using mixed sensors. It will be appreciated that an example method 500 represents an expansion of method 400. The description provided herein with respect to example methods 300 and 400 are also applicable to method 800, where appropriate.

In particular, according to example method 800, at step 308, a provisional alarm indicating an intrusion alarm is received. At step 316, a present condition of a type corresponding to the intrusion alarm is sensed. As described herein, the present condition may be the presence of person or object. At step 324, it is determined whether the presence of a person or object has actually been detected by the additional sensor that is an occupancy sensor.

If occupancy is detected at step 324, the method 800 proceeds to step 340 to transmit a normal alarm signal to the external service provider 7 and further to step 348 to transmit an alert to a registered user device 6.

If no occupancy is detected at step 324, the method proceeds to step 808 to sense an additional present condition other than the type of condition sensed at step 316.

At step 816, it is determined whether the additional present condition sensed at step 808 exceeds an additional predetermined threshold corresponding to additional present condition type.

If the additional present condition sensed at step 808 exceeds the additional predetermined threshold, the method proceeds to step 340 to transmit a normal alarm signal to the external service provider 7.

If the additional present condition sensed at step 808 does not exceed the additional predetermined threshold, the method proceeds to step 408 to transmit a verification request to at least one remote user device 6 registered with the thermostat system 2 and to receive confirmation or rejection of the provisional alarm.

Advantageously, the method 800 allows the use different types of sensors in order to confirm a provisional alarm. For example, based on a provisional alarm of the intrusion type, the use additional sensors may be used to detect an alarm of a same type (e.g. intrusion) or a different type (e.g. fire, dangerous gas, etc.)

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A system for determining a false alarm, the system comprising:
   a memory unit for storing a plurality of instructions;
   a safety alarm hub configured to receive a provisional alarm;
   a processor coupled to the memory unit, the processor being configured to:
      receive the provisional alarm signal from a safety alarm hub, the provisional alarm signal indicating an alarm type;
      upon receipt of the provisional alarm signal, sense with at least one sensor at least one present condition of a type corresponding to the alarm type indicated by the provisional alarm signal,
         wherein the at least one sensor is independent of the safety alarm hub,
         wherein a defect of the safety alarm hub that causes a sensing of a change in condition does not affect the sensing and an alarm triggering with the at least one sensor or a tampering of the safety alarm hub does not affect the sensing and the alarm triggering with the at least one sensor unless the at least one sensor is also separately tampered with, and
         wherein the at least one present condition varies depending on the alarm type that is indicated by the received provisional alarm signal; and
      transmit a normal alarm signal based on the at least one present condition sensed by the sensor.

2. The system of claim 1, wherein the system is a thermostat and comprises the at least one sensor and a HVAC interface.

3. The system of claim 1, wherein the normal alarm is transmitted to an external service provider.

4. The system of claim 1, wherein transmitting the normal alarm comprises:
   determining whether the sensed present condition exceeds a predetermined threshold; and
   transmitting the normal alarm if the sensed present condition exceeds the predetermined threshold.

5. The system of claim 1, wherein transmitting the normal alarm comprises:
   transmitting a verification request to a user device, the request indicating the condition type; and
   transmitting the normal alarm signal in response to receiving a response from the user device confirming the provisional alarm.

6. The system of claim 4, wherein transmitting the normal alarm comprises:
   transmitting a verification request to a user device if the sensed present condition does not exceed the predetermined threshold, the request indicating the alarm type; and
   transmitting the normal alarm signal in response to receiving a response from the user device confirming the provisional alarm.

7. The system of claim 6, wherein the alarm type is intrusion and the at least one sensor comprises an occupancy sensor.

8. The system of claim 6, wherein the alarm type is fire alarm and the at least one sensor comprises at least one of a smoke detector and a temperature sensor.

9. The system of claim 1, wherein the alarm type is presence of a gas and the at least one sensor comprises a gas detector.

10. A method for determining a false alarm, the method comprising:
- receiving a provisional alarm signal from a safety alarm hub, the provisional alarm signal indicating an alarm type;
- upon receipt of the provisional alarm signal, sensing with at least one sensor at least one present condition of a type corresponding to the alarm type indicated by the provisional alarm signal,
- wherein the at least one sensor is independent of the safety alarm system hub,
- wherein a defect of the safety alarm hub that causes a sensing of a change in condition does not affect the sensing and an alarm triggering with the at least one sensor or a tampering of the safety alarm hub does not affect the sensing and the alarm triggering with the at least one sensor unless the at least one sensor is also separately tampered with, and
- wherein the at least one present condition varies depending on the alarm type that is indicated by the received provisional alarm signal; and
- transmitting a normal alarm signal based on the at least one present condition sensed by the sensor.

11. The method of claim 10, wherein the at least one sensor is internal to a thermostat system having a HVAC interface.

12. The method of claim 10, wherein the normal alarm is transmitted to an external service provider.

13. The method of claim 10, wherein the transmitting the normal alarm comprises:
- determining whether the sensed present condition exceeds a predetermined threshold; and
- transmitting the normal alarm if the sensed present condition exceeds the predetermined threshold.

14. The method of claim 10, wherein the transmitting the normal alarm comprises:
- transmitting a verification request to a user device, the request indicating the condition type; and
- transmitting the normal alarm signal in response to receiving a response from the user device confirming the provisional alarm.

15. The method of claim 13, wherein the transmitting the normal alarm comprises:
- transmitting a verification request to a user device if the sensed present condition does not exceed the predetermined threshold, the request indicating the alarm type; and
- transmitting the normal alarm signal in response to receiving a response from the user device confirming the provisional alarm.

16. The method of claim 10, wherein the alarm type is intrusion and the at least one sensor comprises an occupancy sensor.

17. The method of claim 10, wherein the alarm type is fire alarm and the at least one sensor comprises at least one of a smoke detector and a temperature sensor.

18. The method of claim 10, wherein the alarm type is presence of a gas and the at least one sensor comprises a gas detector.

19. A non-transitory computer readable medium comprising a plurality of instructions for performing a method for determining a false alarm, wherein the instructions, when executed, configure a processor to:
- receive a provisional alarm signal from a safety alarm hub, the provisional alarm signal indicating an alarm type;
- upon receipt of the provisional alarm signal, sense with at least one sensor at least one present condition of a type corresponding to the alarm type indicated by the provisional alarm signal,
- wherein the at least one sensor is independent of the safety alarm hub,
- wherein a defect of the safety alarm hub that causes a sensing of a change in condition does not affect the sensing and an alarm triggering with the at least one sensor or a tampering of the safety alarm system device does not affect the sensing and the alarm triggering with the at least one sensor unless the at least one sensor is also separately tampered with, and
- wherein the at least one present condition varies depending on the alarm type that is indicated by the received provisional alarm signal; and
- transmit a normal alarm signal based on the at least one present condition sensed by the sensor.

* * * * *